United States Patent
Prasertvithyakarn et al.

(10) Patent No.: US 10,668,379 B2
(45) Date of Patent: Jun. 2, 2020

(54) COMPUTER-READABLE RECORDING MEDIUM, COMPUTER APPARATUS, IMAGE DISPLAY METHOD

(71) Applicant: SQUARE ENIX CO., LTD., Tokyo (JP)

(72) Inventors: Prasert Prasertvithyakarn, Tokyo (JP); Tatsuhiro Joudan, Tokyo (JP); Hidekazu Kato, Tokyo (JP)

(73) Assignee: SQUARE ENIX CO., LTD., Tokyo (JP)

(*) Notice: Subject to any disclaimer, the term of this patent is extended or adjusted under 35 U.S.C. 154(b) by 247 days.

(21) Appl. No.: 15/819,399

(22) Filed: Nov. 21, 2017

(65) Prior Publication Data

US 2018/0140951 A1     May 24, 2018

(30) Foreign Application Priority Data

Nov. 22, 2016 (JP) ................................. 2016-227287

(51) Int. Cl.
| | |
|---|---|
| *A63F 13/5252* | (2014.01) |
| *A63F 13/58* | (2014.01) |
| *A63F 13/822* | (2014.01) |
| *G06T 15/20* | (2011.01) |
| *A63F 13/497* | (2014.01) |

(52) U.S. Cl.
CPC .......... *A63F 13/5252* (2014.09); *A63F 13/58* (2014.09); *A63F 13/822* (2014.09); *G06T 15/205* (2013.01); *A63F 13/497* (2014.09)

(58) Field of Classification Search
CPC .... A63F 13/5252; A63F 13/58; A63F 13/822; A63F 13/497; G06T 15/205
See application file for complete search history.

(56) References Cited

U.S. PATENT DOCUMENTS

| | | | |
|---|---|---|---|
| 6,650,329 B1 | 11/2003 | Koike | |
| 8,641,523 B2* | 2/2014 | Hiroshige | ............... A63F 13/10 463/33 |
| 9,445,081 B1* | 9/2016 | Kouperman | ........... H04N 5/247 |

(Continued)

FOREIGN PATENT DOCUMENTS

| | | |
|---|---|---|
| JP | 2000-334168 | 12/2000 |
| JP | 2005-152318 | 6/2005 |

(Continued)

OTHER PUBLICATIONS

Office Action from Japan Patent Office (JPO) in Japanese Patent Appl. No. 2016-227287, dated Jul. 3, 2018, together with a partial English language translation.

(Continued)

*Primary Examiner* — Dmitry Suhol
*Assistant Examiner* — Ankit B Doshi
(74) *Attorney, Agent, or Firm* — Greenblum & Bernstein, P.L.C.

(57) ABSTRACT

A three-dimensional virtual space is photographed by a virtual camera to generate a first image and a second image different from the first image. The first image synchronously displays the state of the virtual space, and the second image is displayed asynchronously with the first image. The first image and the second image are obtained by photographing the three-dimensional virtual space in parallel.

17 Claims, 17 Drawing Sheets

(56) References Cited

U.S. PATENT DOCUMENTS

| | | | |
|---|---|---|---|
| 10,137,371 B2* | 11/2018 | Kim | A63F 13/49 |
| 2009/0244064 A1 | 10/2009 | Inokuchi et al. | |
| 2012/0302341 A1 | 11/2012 | Abe | |
| 2018/0001198 A1* | 1/2018 | Frappiea | A63F 13/213 |
| 2018/0144547 A1* | 5/2018 | Shakib | G06T 19/003 |

FOREIGN PATENT DOCUMENTS

| | | |
|---|---|---|
| JP | 2009-237680 | 10/2009 |
| JP | 2012-239746 | 12/2012 |
| JP | 2013-126559 | 6/2013 |
| JP | 2014-061037 | 4/2014 |

OTHER PUBLICATIONS

Office Action from Japan Patent Office (JPO) in Japanese Patent Appl. No. 2016-227287, dated Nov. 21, 2017, together with a partial English language translation.

\* cited by examiner

FIG. 8A

IMPORTANCE MASTER TABLE

| CHARACTER | TYPE | IMPORTANCE |
|---|---|---|
| A | MAIN CHARACTER | 5 |
| B | MINOR CHARACTER | 3 |
| C | BOSS CHARACTER | 5 |
| D | NORMAL ENEMY CHARACTER | 1 |
| E | NORMAL ENEMY CHARACTER | 1 |
| F | MAIN CHARACTER (NPC) | 4 |
| ... | ... | ... |

FIG. 8B

MOTION EVALUATION VALUE MASTER TABLE

| ACTION | MOTION EVALUATION VALUE |
|---|---|
| NORMAL ACTION | 1 |
| KILLER TECHNIQUE A | 5 |
| KILLER TECHNIQUE B | 4 |
| USE OF MAGIC (LARGE) | 4 |
| USE OF MAGIC (SMALL) | 2 |
| FAILURE IN ACTION | 3 |
| SLEEP STATE | 2 |
| ... | ... |

COMPUTER-READABLE RECORDING MEDIUM, COMPUTER APPARATUS, IMAGE DISPLAY METHOD

CROSS REFERENCE TO RELATED APPLICATION

The present disclosure relates to subject matter contained in Japanese Patent Application No. 2016-227287, filed on Nov. 22, 2016, the disclosure of which is expressly incorporated herein by reference in its entirety.

BACKGROUND OF THE INVENTION

Field of the Invention

The present invention relates to an image display program for displaying substance of a content in an image different from the substance displayed during the progress of the content without replaying the content by a user.

Description of Related Art

Hitherto, there have been games equipped with a replay function of reproducing a winning scene or a goal scene in a video game, such as a fight game for fighting with an opponent by operating a character or the like by a user, or a sports game imitating a real game such as baseball or soccer. A general replay function is a function for reproducing an image by storing a user's input operation and history information, such as elapsed time information, in a computer apparatus and by performing the same image generation process as that during a game using the history information when receiving a request for reproducing a replay movie.

History data used for the generation of a replay movie is not necessarily input operation by a user, and there has been a technique related to the generation of the replay movie in a game in which a result varies on the basis of the status of a character (for example, JP-A-2013-126559). In addition, there has been a technique for reproducing a replay movie from a user's favorite angle by a plurality of virtual cameras during the reproduction of the replay movie (for example, JP-A-2000-334168).

SUMMARY OF THE INVENTION

Technical Problem

However, in order to ascertain the substance of a game again after playing the game, it is necessary to naturally replay the game for a period of time which is the same as a period of time for which the game is played, and thus a user cannot simply ascertain the substance of the game.

An object of at least one embodiment of the invention is to provide an image display program, a computer apparatus, an image display method, a server apparatus, and an image display system for causing a user to simply ascertain the substance of a content without performing replay.

Solution to Problem

According to a non-limiting aspect, a non-transitory computer-readable recording medium including an image display program which is executed on a computer apparatus that includes a display screen, the image display program causing the computer apparatus to function as: a content processor that progresses a content so that a state of a three-dimensional virtual space changes with elapse of time; a first image generator that photographs the three-dimensional virtual space by a virtual camera to generate a first image; a second image generator that photographs the three-dimensional virtual space by a virtual camera to generate a second image different from the first image; a first image displayer that synchronously displays the state of the three-dimensional virtual space and the first image on the display screen; and a second image displayer that displays the second image on the display screen asynchronously with the first image, wherein the first image and the second image are obtained by photographing the three-dimensional virtual space in parallel.

According to a non-limiting aspect, a computer apparatus including a display screen, the computer apparatus comprising: content processor that progresses a content so that a state of a three-dimensional virtual space changes with elapse of time; a first image generator that photographs the three-dimensional virtual space by a virtual camera to generate a first image; a second image generator that photographs the three-dimensional virtual space by a virtual camera to generate a second image different from the first image; a first image displayer that synchronously displays the state of the three-dimensional virtual space and the first image on the display screen; and a second image displayer that displays the second image on the display screen asynchronously with the first image, wherein the first image and the second image are obtained by photographing the three-dimensional virtual space in parallel.

According to a non-limiting aspect, an image display method executed on a computer apparatus including a display screen, the image display method comprising: progressing a content so that a state of a three-dimensional virtual space changes with elapse of time; generating a first image by photographing the three-dimensional virtual space by a virtual camera to generate a first image; generating a second image by photographing the three-dimensional virtual space by a virtual camera to generate a second image different from the first image; displaying a first image that displays synchronously the state of the three-dimensional virtual space and the first image on the display screen; and displaying a second image on the display screen asynchronously with the first image, wherein the first image and the second image are obtained by photographing the three-dimensional virtual space in parallel.

According to a non-limiting aspect, a non-transitory computer-readable recording medium including an image display program which is executed on a server apparatus capable of communicating with a computer apparatus including a display screen, the image display program causing the server apparatus to function as: a content processor that progresses a content so that a state of a three-dimensional virtual space changes with elapse of time; a first image generator that photographs the three-dimensional virtual space by a virtual camera to generate a first image; and a second image generator that photographs the three-dimensional virtual space by a virtual camera to generate a second image different from the first image, wherein the computer apparatus synchronously displays the state of the three-dimensional virtual space and the first image on the display screen, and displays the second image on the display screen asynchronously with the first image, and wherein the first image and the second image are obtained by photographing the three-dimensional virtual space in parallel.

According to a non-limiting aspect, an image display system that includes a computer apparatus including a display screen and a server apparatus capable of communicating with the computer apparatus, the image display system including: a content processor that progresses a content so that a state of a three-dimensional virtual space changes with elapse of time; a first image generator that photographs the three-dimensional virtual space by a virtual camera to generate a first image; and a second image generator that photographs the three-dimensional virtual space by a virtual camera to generate a second image different from the first image, wherein the computer apparatus includes a first image displayer that synchronously displays the state of the three-dimensional virtual space and the first image on the display screen, and a second image displayer that displays the second image on the display screen asynchronously with the first image, and wherein the first image and the second image are obtained by photographing the three-dimensional virtual space in parallel.

According to a non-limiting aspect, a non-transitory computer-readable recording medium including an image display program which is executed on a server apparatus and a computer apparatus that includes a display screen and is capable of being connected to the server apparatus by communication, wherein the server apparatus progresses a content so that a state of a three-dimensional virtual space changes with elapse of time, photographs the three-dimensional virtual space by a virtual camera to generate a first image, and photographs the three-dimensional virtual space by a virtual camera to generate a second image different from the first image, and the image display program causing the computer apparatus to function as: a first image displayer that synchronously displays the state of the three-dimensional virtual space and the first image on the display screen; and a second image displayer that displays the second image on the display screen asynchronously with the first image, wherein the first image and the second image are obtained by photographing the three-dimensional virtual space in parallel.

According to a non-limiting aspect, an image display method executed on a server apparatus capable of communicating with a computer apparatus including a display screen, the image display method including: progressing a content so that a state of a three-dimensional virtual space changes with elapse of time; generating a first image by photographing the three-dimensional virtual space by a virtual camera to generate a first image; and generating a second image by photographing the three-dimensional virtual space by a virtual camera to generate a second image different from the first image, wherein in the computer apparatus, the state of the three-dimensional virtual space and the first image are synchronously displayed on the display screen, and the second image is displayed on the display screen asynchronously with the first image, and wherein the first image and the second image are obtained by photographing the three-dimensional virtual space in parallel.

According to a non-limiting aspect, an image display method executed on a system that includes a computer apparatus including a display screen and a server apparatus capable of communicating with the computer apparatus, the image display method including: progressing a content so that a state of a three-dimensional virtual space changes with elapse of time; generating a first image by photographing the three-dimensional virtual space by a virtual camera to generate a first image; and generating a second image by photographing the three-dimensional virtual space by a virtual camera to generate a second image different from the first image, wherein in the computer apparatus, the state of the three-dimensional virtual space and the first image are synchronously displayed on the display screen, and the second image is displayed on the display screen asynchronously with the first image, and wherein the first image and the second image are obtained by photographing the three-dimensional virtual space in parallel.

Advantageous Effects of Invention

One or more of the above problems can be solved with each embodiment of the present invention.

BRIEF DESCRIPTION OF THE DRAWINGS

FIGS. 8A and 8B are diagrams illustrating a data table for calculating an evaluation value for each character, which corresponds to at least one embodiment according to the present invention.

DESCRIPTION OF EMBODIMENTS

Hereinafter, embodiments of the invention will be described with reference to the accompanying drawings. Hereinafter, description relating to effects shows an aspect of the effects of the embodiments of the invention, and does not limit the effects. Further, the order of respective processes that form a flowchart described below may be changed in a range without contradicting or creating discord with the processing contents thereof.

First Embodiment

Figure 1:
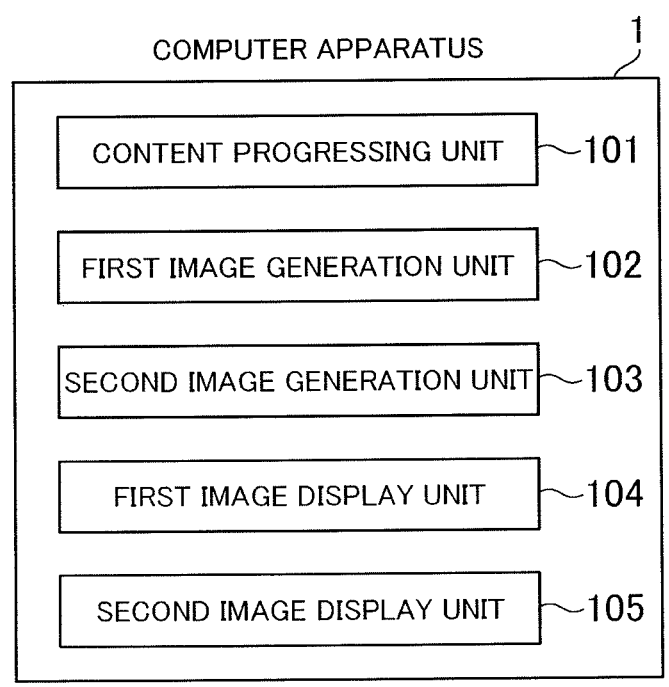
FIG. 1 is a block diagram illustrating a configuration of a computer apparatus, which corresponds to at least one embodiment according to the present invention.

A first embodiment of the present invention will be described. FIG. 1 is a block diagram illustrating a configuration of a computer apparatus, which corresponds to at least one embodiment according to the present invention. The computer apparatus 1 includes at least a content progressing unit 101, a first image generation unit 102, a second image generation unit 103, a first image display unit 104, and a second image display unit 105.

The content progressing unit 101 has a function of progressing a content so that the state of a three-dimensional virtual space changes with the elapse of time. The first image generation unit 102 has a function of photographing the three-dimensional virtual space by a virtual camera to generate a first image. The second image generation unit 103 has a function of photographing the three-dimensional virtual space by a virtual camera to generate a second image different from the first image. The first image display unit 104 has a function of synchronously displaying the state of the three-dimensional virtual space and the first image on a display screen. The second image display unit 105 has a function of displaying the second image on the display screen asynchronously with the first image.

Figure 2:
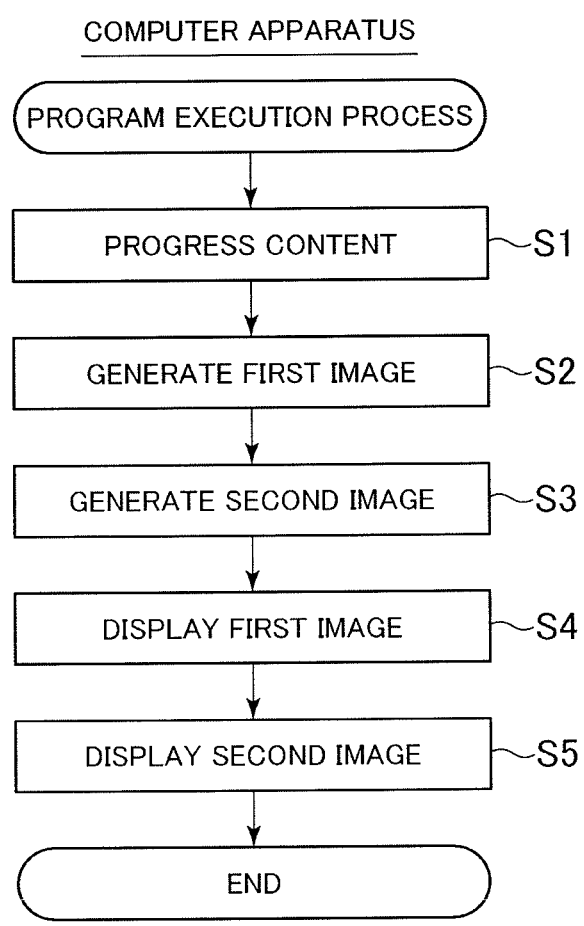
FIG. 2 is a flowchart of a program executing process, which corresponds to at least one embodiment according to the present invention.

A program execution process in the first embodiment of the invention will be described. FIG. 2 is a flowchart of a program execution process, which corresponds to at least one embodiment according to the present invention.

The computer apparatus 1 progresses a content so that the state of the three-dimensional virtual space changes with the elapse of time (step S1). Next, the three-dimensional virtual space is photographed by the virtual camera to generate the first image (step S2). The three-dimensional virtual space is photographed by the virtual camera to generate the second image different from the first image (step S3).

Subsequently, the state of the three-dimensional virtual space and the first image are synchronously displayed on the display screen (step S4). The second image is displayed on the display screen asynchronously with the first image (step S5), and the process is terminated.

In the first embodiment, the first image and the second image are obtained by photographing the three-dimensional virtual space in parallel.

As an aspect of the first embodiment, the second image different from the first image is generated, and the first image and the second image are generated by photographing the three-dimensional virtual space in parallel, so that it is possible to display the substance of a content, without replaying the content by a user, in an image different from substance displayed during the progress of the content.

According to the first embodiment, the "computer apparatus" means, for example, a desktop type or laptop type personal computer, a tablet computer, a PDA or the like, and may be a portable terminal device whose display screen is provided with a touch panel sensor. The "state of three-dimensional virtual space" means, for example, variable scenery or shape of an object of a three-dimensional virtual space expressed by the computer apparatus, and the state of each component which is used for the expression of the inside of the space. The "content" means, for example, a concept including a change in the state of the three-dimensional virtual space with the elapse of time in accordance with a predetermined program such as a simulation in addition to a game.

The "virtual camera" means, for example, a camera which is used for drawing computer graphics and is virtually installed within a three-dimensional virtual space. The "image" includes, for example, a figure, a picture, an image, graphics, or the like, and may be any of a still image and a movie.

The "photographing in parallel" means, for example, concurrently execution of a plurality of photographing processes.

Second Embodiment

Figure 3:
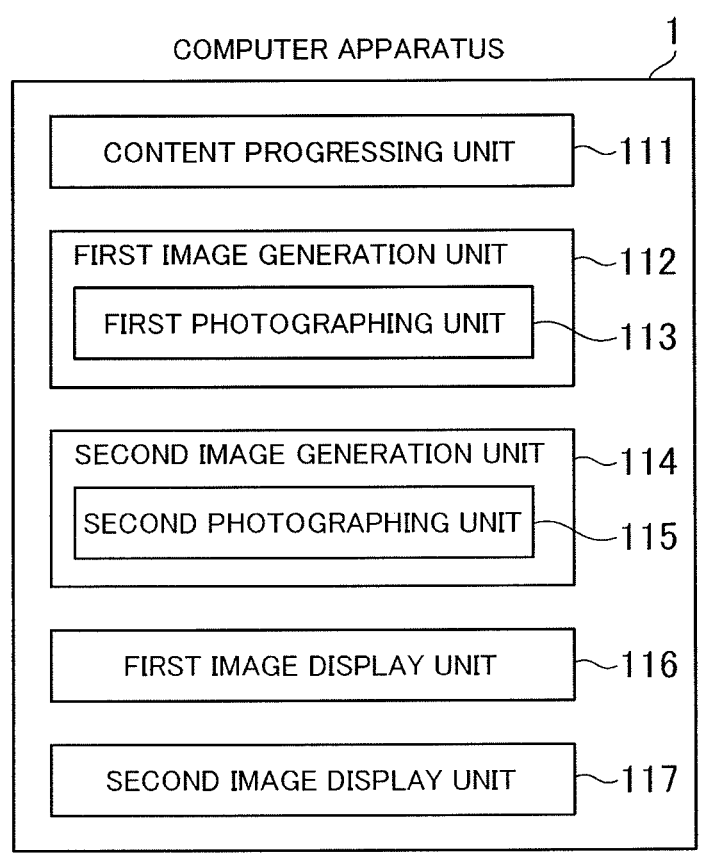
FIG. 3 is a block diagram illustrating a configuration of a computer apparatus, which corresponds to at least one embodiment according to the present invention.

Next, an outline of a second embodiment of the present invention will be described. FIG. 3 is a block diagram illustrating a configuration of a computer apparatus, which corresponds to at least one embodiment according to the present invention. A computer apparatus 1 includes at least a content progressing unit 111, a first image generation unit 112, a first photographing unit 113, a second image generation unit 114, a second photographing unit 115, a first image display unit 116, and a second image display unit 117.

The content progressing unit 111 has a function of progressing a content so that the state of a three-dimensional virtual space changes with the elapse of time. The first image generation unit 112 has a function of photographing the three-dimensional virtual space by a virtual camera to generate a first image. The first photographing unit 113 has a function of photographing the three-dimensional virtual space by a first virtual camera.

The second image generation unit 114 has a function of photographing the three-dimensional virtual space by a virtual camera to generate a second image different from the first image. The second photographing unit 115 has a function of photographing the three-dimensional virtual space by a second virtual camera having a different position, gaze point, or inclination from that of the first virtual camera.

The first image display unit 116 has a function of synchronously displaying the state of the three-dimensional virtual space and the first image on a display screen. The second image display unit 117 has a function of displaying the second image on the display screen asynchronously with the first image.

Figure 4:
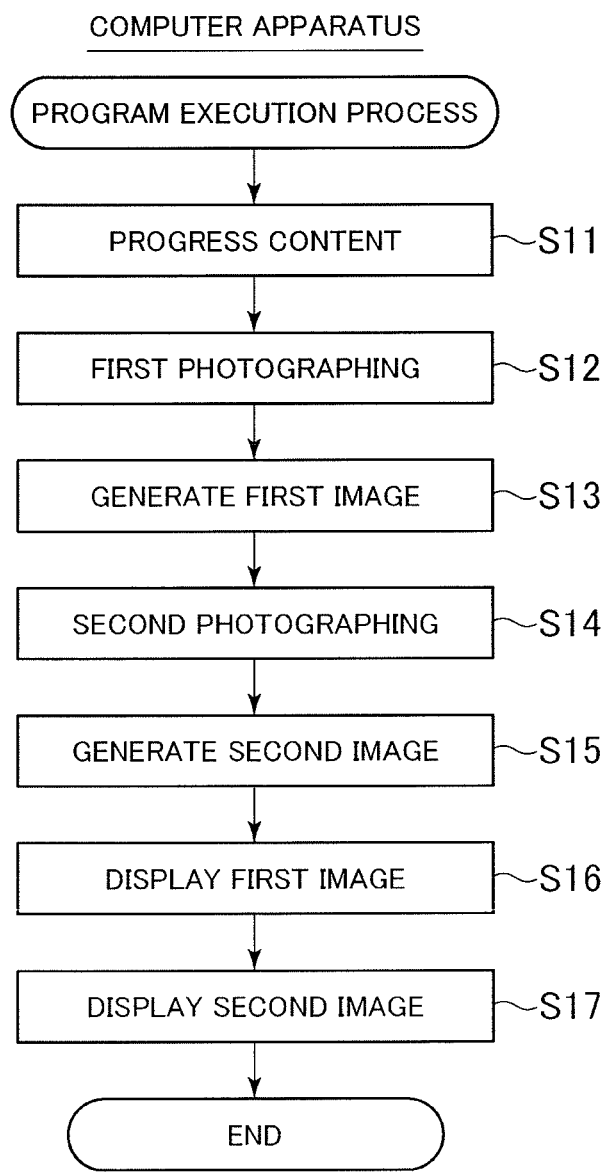
FIG. 4 is a flowchart of a program executing process, which corresponds to at least one embodiment according to the present invention.

A program execution process in the second embodiment of the invention will be described. FIG. 4 is a flowchart of the program execution process, which corresponds to at least one embodiment according to the present invention.

The computer apparatus 1 progresses a content so that the state of a three-dimensional virtual space changes with the elapse of time (step S11). Next, the three-dimensional virtual space is photographed by the first virtual camera (step S12), and generate the first image (step S13). The three-dimensional virtual space is photographed by the second virtual camera having a different position, gaze point, or inclination from that of the first virtual camera (step S14), and generate the second image different from the first image (step S15).

Subsequently, the state of the three-dimensional virtual space and the first image are synchronously displayed on the display screen (step S16). The second image is displayed on the display screen asynchronously with the first image (step S17), and the process is terminated.

In the second embodiment, the first image and the second image are obtained by photographing the three-dimensional virtual space in parallel.

As an aspect of the second embodiment, the three-dimensional virtual space is photographed by the second virtual camera having a different position, gaze point, or inclination from that of the first virtual camera, so that it is possible to display the substance of a content by a composition different from substance displayed during the progress of the content.

According to the second embodiment, the "computer apparatus", the "state of three-dimensional virtual space", the "content", the "virtual camera", the "image", and the "photographing in parallel" are respectively the same as the contents described in the first embodiment.

According to the second embodiment, the "position" means, for example, the position of a virtual camera that photographs the three-dimensional virtual space, and may be determined on the basis of coordinates of a coordinate system for forming the three-dimensional virtual space. The "gaze point" means, for example, a point at which the virtual camera gazes, and may be determined on the basis of coordinates of the coordinate system for forming the three-dimensional virtual space. The "inclination" means, for example, an angle with respect to a z-axis direction of a straight line indicating the vertical direction of the virtual camera in a case where the three-dimensional virtual space is indicated by a rectangular coordinate system.

Third Embodiment

Next, an outline of a third embodiment of the present invention will be described. Regarding a computer apparatus according to the third embodiment, it is possible to adopt the same configuration as that illustrated in the block diagram of FIG. 3.

In addition, regarding a flow of a program execution process in the third embodiment, it is possible to adopt the same configuration as that illustrated in the flowchart of FIG. 4.

In the third embodiment, an object in a three-dimensional virtual space has an attribute regarding by which virtual camera out of a first virtual camera and a second virtual camera the object is to be targeted of photographing or an attribute regarding by which virtual camera the object is not to be targeted of photographing.

In the third embodiment, a first photographing unit 113 and a second photographing unit 115 photographs a three-dimensional virtual space in accordance with the attribute of the object.

As an aspect of the third embodiment, an object in a three-dimensional virtual space has an attribute regarding by which virtual camera out of the first virtual camera and the second virtual camera the object is to be targeted of photographing or an attribute regarding by which virtual camera the object is not to be targeted of photographing, and thus it is possible to generate the second image by using, for example, an object which is not displayed in the first image and is displayed in only the second image.

According to the third embodiment, the "computer apparatus", the "state of three-dimensional virtual space", the "content", the "virtual camera", the "image", and the "photographing in parallel" are respectively the same as contents described in the first embodiment. In addition, the "position", "gaze point", and "inclination" are respectively the same as contents described in the second embodiment.

Fourth Embodiment

Next, an outline of a fourth embodiment of the present invention will be described. Regarding a computer apparatus according to the fourth embodiment, it is possible to adopt the same configuration as that illustrated in the block diagram of FIG. 3.

In addition, regarding a flow of a program execution process in the fourth embodiment, it is possible to adopt the same configuration as that illustrated in the flowchart of FIG. 4.

In the fourth embodiment, a second photographing unit 115 photographs a three-dimensional virtual space by determining the position, gaze point, or inclination of a second virtual camera on the basis of a skeletal information on an object to be targeted of photographing in the three-dimensional virtual space.

As an aspect of the fourth embodiment, the position, gaze point, or inclination of the second virtual camera is determined on the basis of a skeletal information on an object to be targeted of photographing in the three-dimensional virtual space, and thus it is possible to generate a second image responding to the skeletal information on the object. For example, it is possible to set the position and the like of the virtual camera so that the face and the like of a character are included in a second image to be generated, in a case where an object, for example, a region for making a user easily ascertain the state of an object is a humanoid character.

According to the fourth embodiment, the "computer apparatus", the "state of three-dimensional virtual space", the "content", the "virtual camera", the "image", and the "photographing in parallel" are respectively the same as the contents described in the first embodiment. In addition, the "position", "gaze point", and "inclination" are respectively the same as the contents described in the second embodiment.

In the fourth embodiment, the "skeletal information" means, for example, information for defining the skeleton of an object which is present in a three-dimensional virtual space, the information being used when defining the motion or posture of the object.

Fifth Embodiment

Next, an outline of a fifth embodiment of the present invention will be described. Regarding a computer apparatus according to the fifth embodiment, it is possible to adopt the same configuration as that illustrated in the block diagram of FIG. 3.

In addition, regarding a flow of a program execution process in the fifth embodiment, it is possible to adopt the same configuration as that illustrated in the flowchart of FIG. 4.

In the fifth embodiment, a second photographing unit 115 photographs a three-dimensional virtual space by determining the position, gaze point, or inclination of a second virtual camera on the basis of information on environment in which an object to be targeted of photographing in the three-dimensional virtual space is present.

As an aspect of the fifth embodiment, the position, gaze point, or inclination of the second virtual camera is determined on the basis of information on environment in which an object to be targeted of photographing in the three-dimensional virtual space is present, and thus it is possible to set the position and the like of the virtual camera in consideration of the environment in which an object to be gazed at by the virtual camera is present.

According to the fifth embodiment, the "computer apparatus", the "state of three-dimensional virtual space", the "content", the "virtual camera", the "image", and the "photographing in parallel" are respectively the same as the contents described in the first embodiment. In addition, the "position", "gaze point", and "inclination" are respectively the same as the contents described in the second embodiment, and the "skeletal information" is the same as the contents described in the fourth embodiment.

In the fifth embodiment, the "information on environment" includes, for example, information on a background object such as a mountain or sea for forming a three-dimensional virtual space or an object of a scaffold at which an object and the like to be gazed at by the virtual camera is positioned, or information on a numerical parameter such as a temperature which is set in the three-dimensional virtual space.

Sixth Embodiment

Next, an outline of a sixth embodiment of the present invention will be described. Regarding a computer apparatus according to the sixth embodiment, it is possible to adopt the same configuration as that illustrated in the block diagram of FIG. 3.

In addition, regarding a flow of a program execution process in the sixth embodiment, it is possible to adopt the same configuration as that illustrated in the flowchart of FIG. 4.

In the sixth embodiment, in a case where predetermined photographing conditions are satisfied during the progress of a content, a second photographing unit 115 photographs the inside of a three-dimensional virtual space by a second virtual camera.

As an aspect of the sixth embodiment, in a case where predetermined photographing conditions are satisfied during the progress of a content, the inside of a three-dimensional virtual space is photographed by the second virtual camera, and thus it is possible to efficiently generate an image for ascertaining the substance of the content.

According to the sixth embodiment, the "computer apparatus", the "state of three-dimensional virtual space", the "content", the "virtual camera", the "image", and the "photographing in parallel" are respectively the same as the contents described in the first embodiment. In addition, the "position", "gaze point", and "inclination" are respectively the same as contents described in the second embodiment.

According to the sixth embodiment, the "skeletal information" is the same as the contents described in the fourth embodiment, and the "information on environment" is the same as the contents described in the fifth embodiment.

Seventh Embodiment

Figure 5:
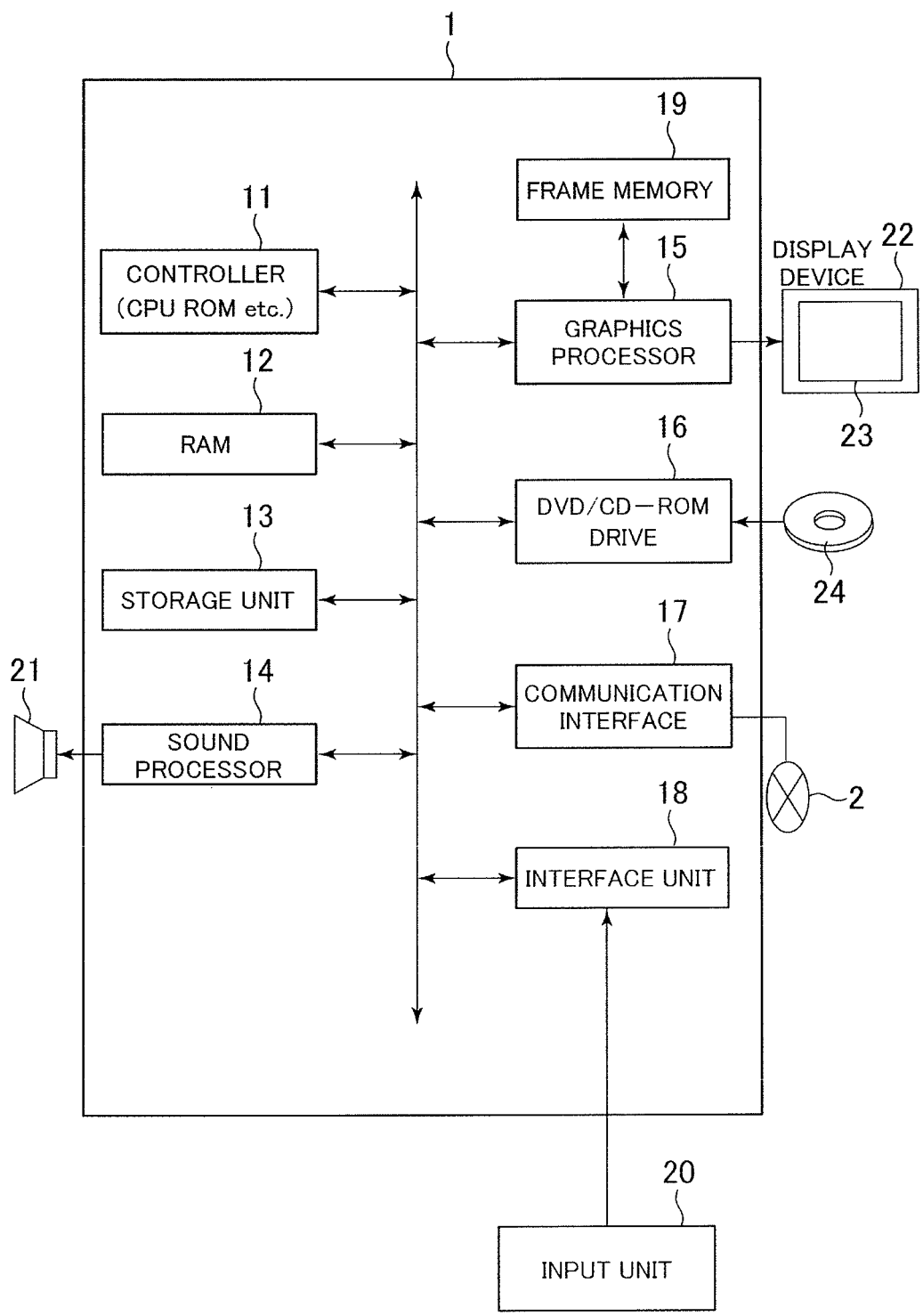
FIG. 5 is a block diagram illustrating a configuration of a computer apparatus, which corresponds to at least one embodiment according to the present invention.

An outline of a seventh embodiment of the invention will be described. FIG. 5 is a block diagram illustrating a configuration of a computer apparatus, which corresponds to at least one embodiment according to the present invention.

The computer apparatus 1 includes a controller 11, a Random Access Memory (RAM) 12, a storage unit 13, a sound processor 14, a graphics processor 15, a DVD/CD-ROM drive 16, a communication interface 17, an interface unit 18. All of these are connected to each other by an internal bus.

The controller 11 is configured to include a Central Processing Unit (CPU) and a Read Only Memory (ROM). The controller 11 executes a program stored in the storage unit 13 or a recording medium 24 so as to control the computer apparatus 1. The controller 11 is also configured to include an inner timer that clocks time.

The RAM 12 is a work area of the controller 11. The storage unit 13 is a storage area for storing a program and data.

The DVD/CD-ROM drive 16 may be adapted to a recording medium 24 which stores programs such as DVD-ROM and CD-ROM. A program and data to execute a game or to reproduce a content are stored in the recording medium 24. The program and data which are necessary to progress the content are led out with the DVD/CD-ROM drive 16 and are loaded to the RAM 12.

The controller 11 performs processing by reading the program and data from the RAM 12. The controller 11 processes the program and data which are loaded to the RAM 12, thereby outputting a sound command to the sound processor 14 and a drawing command to the graphics processor 15.

The sound processor 14 is connected to a sound output device 21 of a speaker. When the controller 11 outputs a sound command to the sound processor 14, the sound processor 14 outputs a sound signal to the sound output device 21.

The graphics processor 15 is connected to a display device 22. The display device 22 includes a display screen 23. When the controller 11 outputs a drawing command to the graphics processor 15, the graphics processor 15 decompresses images on a frame memory (frame buffer), and then outputs a video signal to display images on the display screen 23. The graphics processor 15 draws one image in the unit of frames. For example, one frame time for the image is 1/30 seconds.

An input unit 20 such as an input controller and a keyboard, for example, is connected to the interface unit 18. An input information by a user with respect to the input unit 20 is stored in RAM 12, and a various calculation processing is subjected by the controller 11 on the basis of the input information. An external recording medium such as a memory card may be connected to the interface unit 18. The interface unit 18 execute, for example, a processing to memorize a data concerning a content progress status recorded in RAM 12 into an external recording medium on the basis of a command received from the controller unit 11 and a processing to forward data to RAM 12 by loading the data memorized in an external recording medium.

The communication interface 17 is connected to the communication network 2 in a wireless or wired manner, and may transmit and receive information concerning an operation command, information concerning a content progress status, and the like of a data with an external computer apparatus.

An example of the seventh embodiment is a program of a Role Playing Game (hereinafter, referred to as RPG) in which a character operated by a user can freely move around in a three-dimensional virtual space and progresses a story while performing a virtual fight with an enemy character. In the game, the three-dimensional virtual space is photographed using a plurality of virtual cameras, and an image captured by each of the virtual cameras is displayed on a display screen. Apart from the virtual camera that photographs the state of the three-dimensional virtual space, a character who is a fellow having a camera and is automatically controlled may be set to photograph the inside of the three-dimensional virtual space.

In the program according to this seventh embodiment, a three-dimensional virtual space is formed as a space in which a character is movable, and a user operates an input unit 20 to give an instruction to the character, thereby progressing a game. A position in the three-dimensional virtual space is uniquely specified by coordinates of a world coordinate system (X, Y, Z). All pieces of graphics data in the three-dimensional virtual space are constituted by a plurality of polygons in which coordinates of each vertex are indicated by coordinates of the world coordinate system.

A character is constituted by a plurality of polygons in which coordinates of each vertex are indicated by coordinates of a local coordinate system (x, y, z). The character is configured such that a substantially center point is set as a reference point, and a position in the three-dimensional virtual space is indicated by coordinates in the world coordinate system of the reference point.

In addition, a direction of the character is represented by an angle which is formed by each axis of the local coordinate system with respect to each axis of the world coordinate system. When display processing is performed, coordinates of the vertex of each polygon constituting the character are converted into coordinates of the world coordinate system. In addition, a progression direction of the character is determined on the basis of a relationship between the position of the character in the present frame period and the position of the character in the previous frame period.

Figure 6:
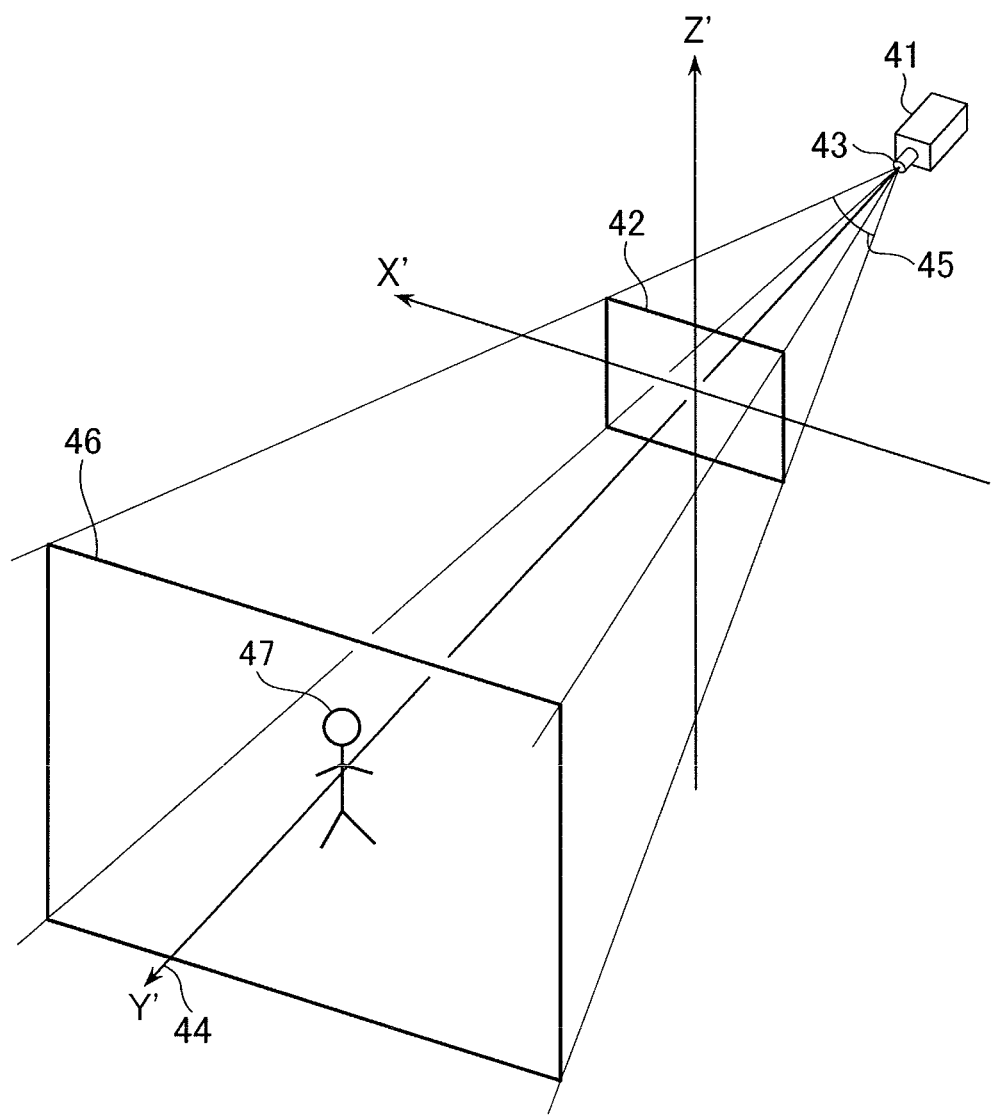
FIG. 6 is a schematic diagram illustrating a perspective transformation method, which corresponds to at least one embodiment according to the present invention.

FIG. 6 is a schematic diagram illustrating a perspective transformation method, which corresponds to at least one embodiment according to the present invention. In this embodiment, the state of a motion of a character in a three-dimensional virtual space during the progress of a game (during the operation of a user) is projected on a display screen 23 by performing perspective transformation of the three-dimensional virtual space by a virtual camera.

A virtual camera 41 is disposed in the three-dimensional virtual space, and an image projected onto a virtual screen 42 serves as an image displayed on the display screen 23. The position of the virtual camera 41 serves as a viewpoint 43, the direction of the virtual camera 41 serves as a visual axis 44, and a region formed by four straight lines connecting the viewpoint 43 and four corners at the vertexes of the virtual screen 42 serves as a field of vision 45. The size of the virtual screen 42 is fixed, the position of the virtual screen 42 is determined when the size of the field of vision 45 is determined, and the size of the field of vision 45 is determined when the position of the virtual screen 42 is determined. In addition, a clip surface 46 is determined at a predetermined distance in the direction of the visual axis 44 from the viewpoint 43, and a clipping range, that is, a range in which an image is generated by perspective transformation in three-dimensional virtual space serves as a range from the virtual screen 42 to the clip surface 46 within a range of the field of vision 45.

In this manner, a coordinate system used in order to project an image onto the virtual screen 42 is a viewpoint coordinate system (X', Y', Z'), and the direction of the visual axis 44 serves as a Y'-axis of the viewpoint coordinate system. Coordinates of the world coordinate system are converted into coordinates of the viewpoint coordinate system, so that perspective transformation processing including hidden surface erasure processing is performed. In a case where an image projected onto the virtual screen 42 is formed by perspective transformation, it is necessary to perform hidden surface erasure for erasing a surface which is hidden due to the presence of another object at the front. As a method of the hidden surface erasure, a Z buffer method can be used.

As a premise that perspective transformation is performed, the position of the viewpoint 43 of the virtual camera 41, the direction of the visual axis 44, the size of the field of vision 45 (a distance between the viewpoint 43 and the virtual screen 42), and a distance between the viewpoint 43 and the clip surface 46 (hereinafter, referred to as a clipping distance) are required to be determined (the position of the virtual screen 42 is necessarily determined when these are determined). The position of the viewpoint 43 is kept at a position spaced apart from a character 47 at a fixed distance, and moves following the character 47. The direction of the visual axis 44 is normally set so as to necessarily face a reference point included in the character 47, and the size of the field of vision 45 and the clipping distance are basically set to be the same size. As described later, in the invention, the position, gaze point (reference point), or inclination of the virtual camera 41 can be controlled by a program, and the position of the viewpoint 43 and the direction of the visual axis 44 can also be controlled.

Figure 7:
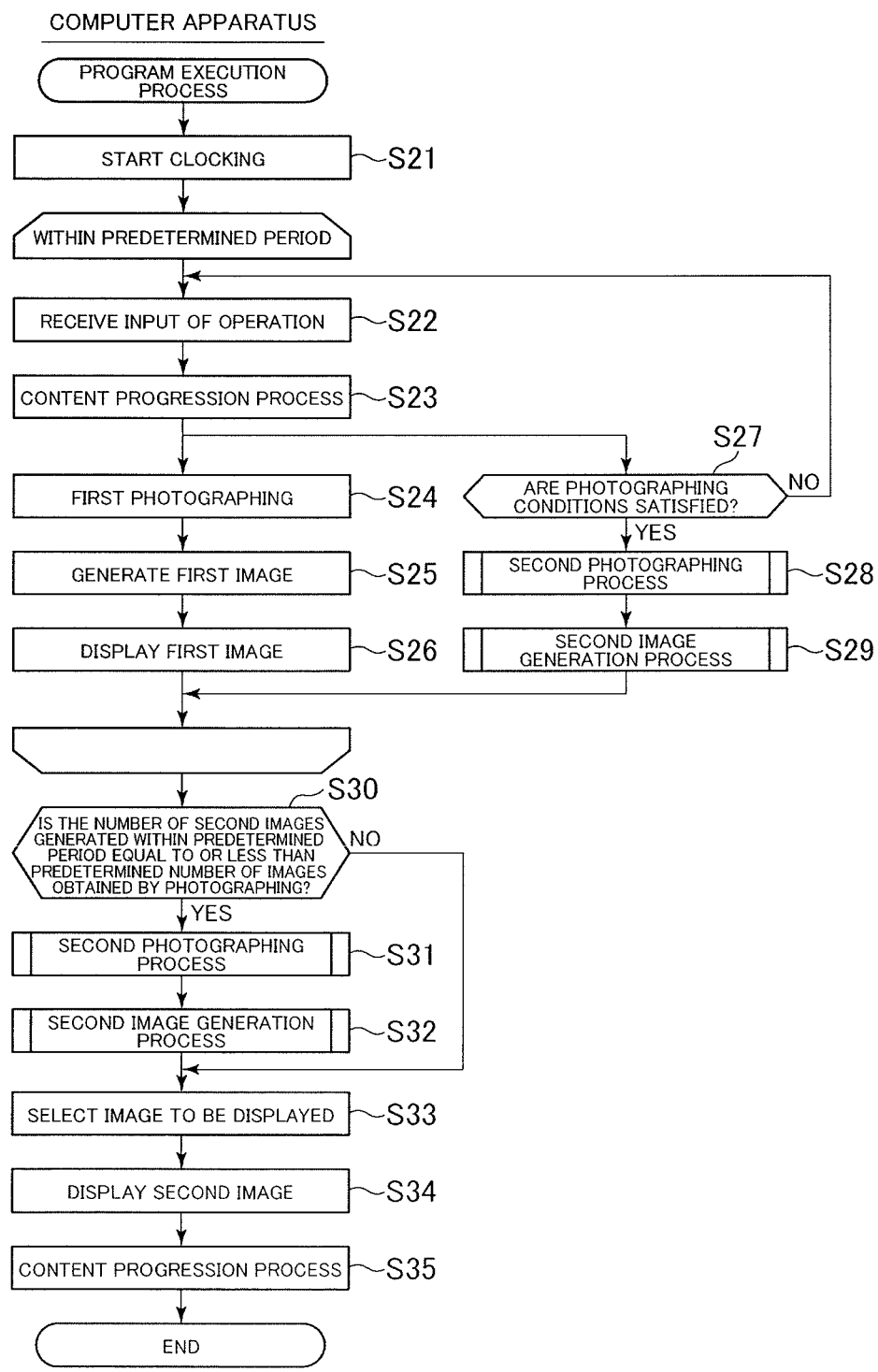
FIG. 7 is a flowchart of a program executing process, which corresponds to at least one embodiment according to the present invention.

Subsequently, a program execution process in the seventh embodiment of the invention will be described. FIG. 7 is a flowchart of the program execution process, which corresponds to at least one embodiment according to the present invention.

When a process of executing the program is started, clocking is started by an internal timer included in a controller 11 (step S21).

Next, in this embodiment, the photographing of a three-dimensional virtual space is executed by division for each predetermined period. The predetermined period may be a period based on a real time clocked by the clocking processing in step S21, or may be a period in a flow of a virtual time in the three-dimensional virtual space. Here, it is assumed that processing from step S22 to step S29 to be described later is repeatedly executed for every three hours in the three-dimensional virtual space by setting three hours as one period by the virtual time in the three-dimensional virtual space. Meanwhile, the length of a predetermined period in which a photographing process using a first virtual camera and a photographing process using a second virtual camera to be described later are executed may be distinguished.

When the computer apparatus 1 receives a user's operation with respect to the input unit 20 (step S22), a content is progressed in accordance with an operation instruction (step S23).

Next, in the seventh embodiment of the invention, the photographing processes using the first virtual camera and the second virtual camera are processed concurrently. The concurrent processing is executed by a single CPU or a plurality of CPUs included in the controller 11.

First, the photographing process in the three-dimensional virtual space using the first virtual camera will be described. The first virtual camera photographs the state of the three-dimensional virtual space (step S24). In the photographing, it is necessary to determine the position, viewpoint, and the like of the first virtual camera as described above. When the state of the three-dimensional virtual space is photographed, a first image to be displayed on the display screen 23 is generated (step S25). It is preferable that the first image is generated in accordance with a frame time. The generated first image is displayed on the display screen 23 (step S26).

The first image generated in step S25 is an image for synchronously representing the state of the three-dimensional virtual space. The user can know the state of the three-dimensional virtual space by confirming the image displayed in step S26.

Next, the photographing process in the three-dimensional virtual space using the second virtual camera will be described. The second virtual camera determines whether or not predetermined photographing conditions are satisfied, unlike the photographing using the first virtual camera (step S27), and photographs the three-dimensional virtual space in a case where the photographing conditions are satisfied (YES in step S27). In a case where the photographing conditions are not satisfied (NO in step S27), the second virtual camera stands by until the user's new operation input is received without photographing the three-dimensional virtual space.

The photographing conditions of the second virtual camera will be described. Examples of the photographing conditions include an evaluation value trigger for determining whether or not an evaluation value regarding the state of the three-dimensional virtual space to be calculated exceeds a predetermined reference value, an event trigger for determination on the basis of an attribute of a content in progress, a random trigger for determination in accordance with a processing load of the computer apparatus or an elapsed time, and a manual trigger for photographing on the basis of the user's operation instruction. Hereinafter, each of the photographing conditions will be described in detail.

Evaluation Value Trigger

An evaluation value is calculated for each object which is present in a three-dimensional virtual space, and photographing is performed in a case where the calculated evaluation value exceeds a predetermined reference value. As a method of calculating the evaluation value, in a case where a friend character and an enemy character fight with each other, for example, in a scene of a virtual fight, an evaluation value of each character can be calculated from an importance which is set for each character and a motion evaluation value which is the degree of conspicuousness of the character's action.

FIGS. 8A and 8B are diagrams illustrating a data table for calculating an evaluation value for each character, which corresponds to at least one embodiment according to the present invention.

FIG. 8A is a diagram illustrating an importance master table for specifying an importance which is set for a character. In an importance master table 50, a type 52 of character and an importance 53 of the character are stored in association with a character 51. Regarding a character in which the character 51 is "A", the type 52 is a "main character", and thus the importance 53 in a scene is "5" which is high. On the other hand, regarding a character in which the character 51 is "D", the type 52 is a "normal enemy character", and thus the importance 53 is set to be "1" which is low.

FIG. 8B is a diagram illustrating a motion evaluation value master table for specifying an evaluation value of a motion which is set for each character. In a motion evaluation value master table 60, a motion evaluation value 62 is stored in association with an action 61. In a case where the action 61 of the character is a "normal action", the motion evaluation value 62 is "1". However, in a case where the action 61 is "killer technique A", the motion evaluation value 62 is "5" which is a high evaluation value.

An evaluation value (t) at a virtual time t can be calculated by the following mathematical formula. Regarding the calculation of the evaluation value, evaluation values may be calculated for all objects present in the entire three-dimensional virtual space and may be added up, or may be calculated for an object which is present within a predetermined range with the coordinate position of the second virtual camera as the center.

$$\text{Evaluation Value }(t) = \Sigma(\text{Importance of Object} \times \text{Motion Evaluation Value }(t))$$

Meanwhile, a reference value compared with the evaluation value may be a fixed value, or may be a value which is determined on the basis of a parameter such as the level or skill of a character.

Event Trigger

Photographing is performed in a case where an attribute of a content in progress is a predetermined attribute. The attribute of the content is a value which is set in accordance with the type of content and indicates the type of scene such as a cut scene in a game (a scene in which a video plays), a scene of a real-time event occurring by synchronizing a real time and a virtual world time with each other, a scene showing exchange with a character or an object in the content, or a scene showing arrival at new land.

In a program in which the progress of a content changes on the basis of the user's operation instruction, an event to occur also varies for each user, and thus a photographing timing varies.

Random Trigger

Photographing is performed in a case where a processing load of the computer apparatus falls below a predetermined reference value or in a case where the number of times of photographing within a predetermined period is equal to or less than a predetermined number of times when the predetermined period has elapsed.

The case where a processing load of the computer apparatus falls below a predetermined reference value is, for example, a case where loads of a controller 11, a RAM 12, a storage unit 13, and/or a graphics processing unit 15 of the computer apparatus 1 are measured and the entirety or a portion of the loads falls below the predetermined reference value. The load of each unit is measured, and thus it is possible to execute processing, such as photographing and image generation, which has a large load at a preferred timing, to distribute the load of the computer apparatus, and to execute an efficient image generation process.

Alternatively, photographing is performed in a case where photographing is not performed even once inclusive of another trigger and even one image is not generated during a predetermined period. For example, in a state where the user's input operation is hardly performed, a content is not completely progressed, but a virtual time within a three-dimensional virtual space elapses. In this case, as an example, in a case where a predetermined period is three hours in the three-dimensional virtual space and photographing is not performed even once until three hours elapses, photographing is automatically performed to generate an image. Alternatively, for example, photographing may be performed on a regular basis such as for every three hours.

Manual Trigger

Photographing is performed in a case where a predetermined operation instruction is input by the user. The predetermined operation instruction means, for example, giving an instruction by inputting a command for instructing photographing by using the second virtual camera or giving an instruction to a friend character which is automatically controlled by the computer apparatus.

Figure 9:
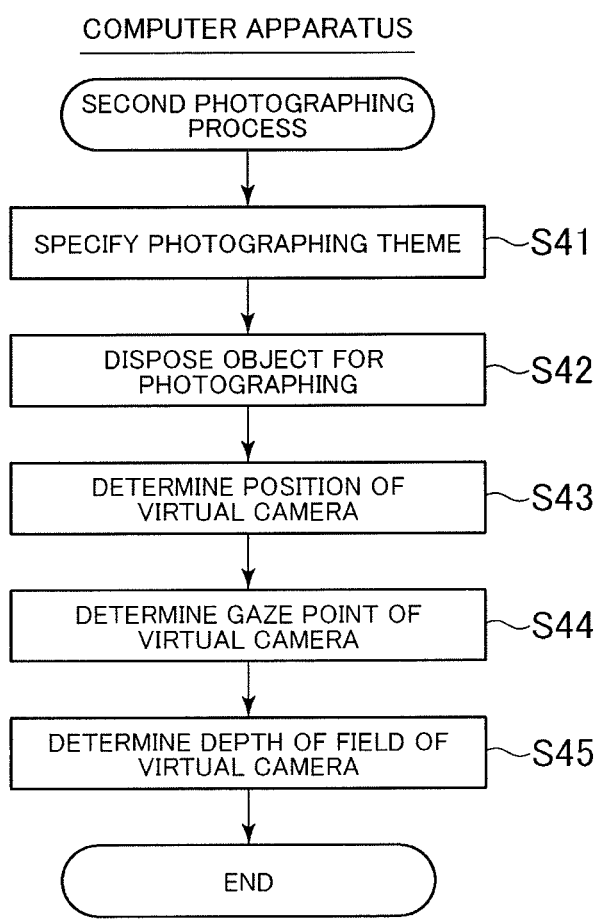
FIG. 9 is a flowchart of the second photographing process, which corresponds to at least one embodiment according to the present invention.

Subsequently, in step S27 of FIG. 7, in a case where the photographing conditions are satisfied (YES in step S27), a second photographing process is executed (step S28). FIG. 9 is a flowchart of the second photographing process, which corresponds to at least one embodiment according to the present invention.

First, a photographing theme is specified (step S41). The photographing theme can be determined in accordance with whether or not any photographing condition has been satisfied in step S27.

For example, in a case where the photographing condition is an "event trigger", a photographing theme of "JOYFUL" suitable for the photographing of a person is specified. When this photographing theme is selected, photographing is performed so as to set a gaze point on a humanoid character, and the photographing is performed by adjusting white balance so that a person's face looks bright.

In addition, in a case where the photographing condition is an "evaluation value trigger", a photographing theme of "EXCITING" suitable for photographing of a state during a fight is specified. When this photographing theme is selected, a gaze point is set on the appearance or weapon of an enemy character so as to include tension during a virtual fight, or photographing is performed from a long distance for comparison of a size with a friend character in order to show the size of the enemy character.

In addition, a theme may be set in accordance with a purpose such as "WONDERFUL" suitable for the photographing of scenery, "PRESET" suitable for the photographing of a commemorative photograph in a cut scene, and "DRIVING" suitable for photographing in a scene during the movement of a vehicle. In addition, a photographing theme may be edited by the user and may be set to be applied to the user's preferred scene.

An algorithm related to framing of a virtual camera to be described later is set for each theme which is specified in step S41, and thus it is possible to determine information such as a position related to photographing in accordance with the algorithm.

Next, an object for photographing is disposed in the three-dimensional virtual space (step S42). In this embodiment, the object has an attribute regarding by which virtual camera out of the first virtual camera and the second virtual camera the object is to be targeted of photographing or an attribute regarding by which virtual camera the object is not to be targeted of photographing.

FIGS. 10A and 10B are diagrams illustrating a photographing target attribute included in an object, which corresponds to at least one embodiment according to the present invention. FIG. 10A is a diagram illustrating an object to be targeted of photographing by a first virtual camera.

In a three-dimensional virtual space 70, when photographing is performed by a first virtual camera 71 in a case where an attribute to be targeted of photographing by the first virtual camera 71 and an attribute not to be targeted of photographing by the first virtual camera are respectively set in an object 72a and an object 72b when photographing is performed by the first virtual camera, the object 72a is photographed and the object 72b is not photographed.

On the other hand, FIG. 10B is a diagram illustrating an object to be targeted of photographing by a second virtual camera having a different position and the like from the first virtual camera. When photographing is performed by a second virtual camera 73, the object 72a is not photographed and the object 72b is photographed.

Figure 10:
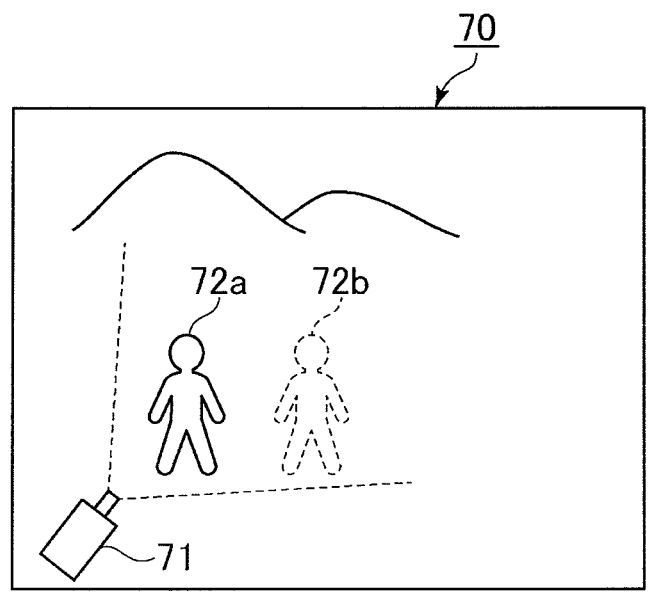
FIGS. 10A and 10B are diagrams illustrating a photographing target attribute included in an object, which corresponds to at least one embodiment according to the present invention.
Figure 10:
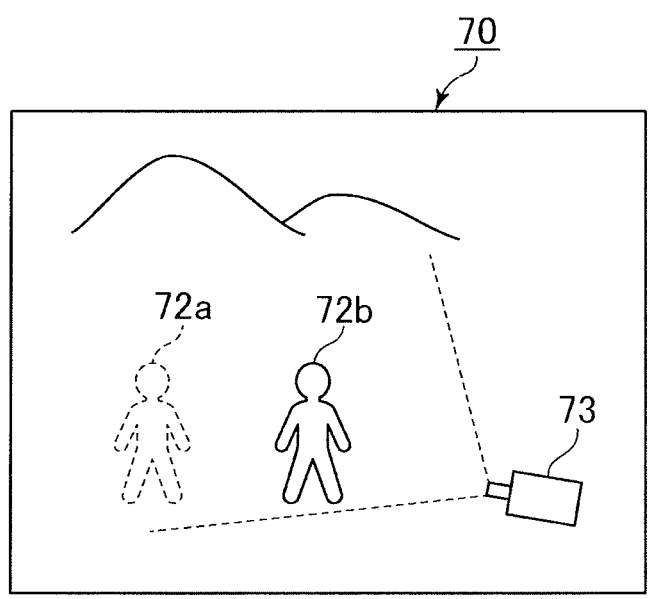

The object for photographing is an object which is equivalent to the object 72b in FIG. 10 and in which an attribute not photographed by the first virtual camera capturing an image synchronously representing the state of the three-dimensional virtual space is set. The object refers to an object of which the mode of the appearance is consistent with that of an object (equivalent to the object 72a) which is photographed by the first virtual camera.

Here, the arrangement of the object for photographing in step S42 refers to arrangement in the three-dimensional virtual space by controlling the mode of an object capable of being photographed by the second virtual camera so that the mode changes depending on the user's operation instruction, a history of the content, or a progression state of the content.

Examples of the change in the mode of the object include a change in the direction of the face of the object for photographing, a change in the posture of the object for photographing, a change in a facial expression by adding a photographing object for a friend character which is not to be originally photographed, arrangement of an additional photographing object for a crowd character, such as a passerby, who is not originally present, deletion of a crowd character which is photographed by the first virtual camera, and the like.

Incidentally, with regard to the arrangement of the above-described object for photographing, it is possible to exhibit the same effects without using a photographing target attribute. For example, a three-dimensional virtual space is reproduced, and photographing is performed using different virtual cameras in two virtual spaces. In this embodiment, a method of reproducing a three-dimensional virtual space may be adopted.

Next, the position of the virtual camera is determined (step S43). The position of the virtual camera is determined in accordance with an algorithm associated with the photographing theme specified in step S41. In more detail, the position of the virtual camera is determined on the basis of skeletal information on an object to be targeted of photographing and information on an environment in which the object is present.

Examples of a method of determining the position of the virtual camera on the basis of the skeletal information on the object include a method of determining the position of the virtual camera so that skeletal information on a specific area of an object to be targeted of photographing, for example, the head is included in a target range for photographing. In addition, examples of a method of determining the position of the virtual camera on the basis of information on an environment in which the object is present include a method of determining the position of the virtual camera so that the scenery of a vast mountain or a characteristic monument of a street is included in a target range for photographing.

Next, a gaze point of the virtual camera is determined (step S44). The gaze point of the virtual camera is determined on the basis of skeletal information on an object to be targeted of photographing and information on an environment in which the object is present, similar to step S43.

Finally, the depth of field of the virtual camera is determined (step S45), and the process is terminated. In principle, the depth of field is matched to an object to be targeted of photographing.

The position, gaze point, and depth of field of the virtual camera can also be designed so as to be changed in accordance with a user's operation instruction, history information on a content, or a progression state of the content. For example, in a case where a certain character is a photographer, photographing skill is improved with the progress of a content, and it is possible to apply changes to the position, gaze point, and depth of field of the virtual camera.

Figure 11:
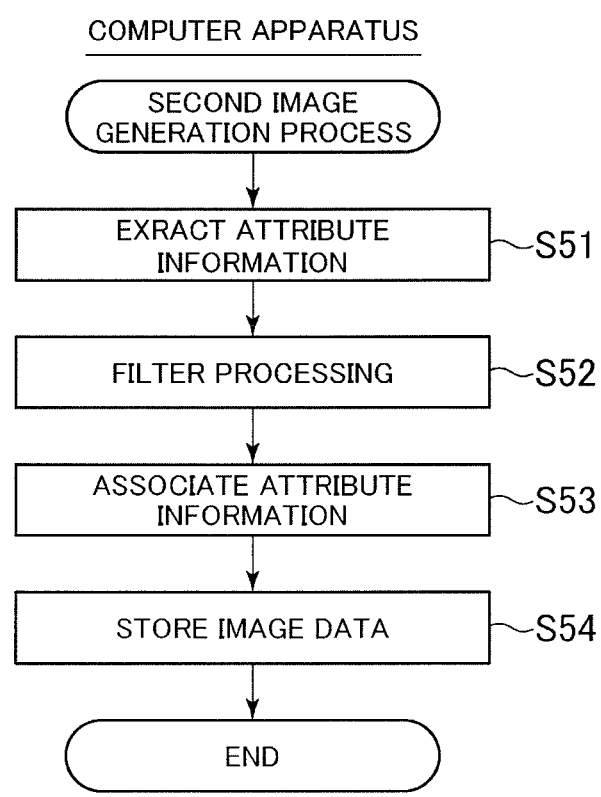
FIG. 11 is a flowchart of the second image generation process, which corresponds to at least one embodiment according to the present invention.

Subsequently, when the second photographing process is terminated, a second image generation process is executed (step S29). FIG. 11 is a flowchart of the second image generation process, which corresponds to at least one embodiment according to the present invention.

First, attribute information on an image captured in the second photographing process of step S28 is extracted (step S51). The attribute information on the image refers to a main subject, the type of photo (the course of a fight, a person image, a scenery image, and the like), a temporal element (morning, day, night, and the like), environmental information such as the color of the ground or a background, the particularity of an action of a character, and the like. The particularity of the action of the character may be calculated on the basis of the motion evaluation value master table 60 described above.

Next, image processing using a filter is executed on a captured image (step S52). There are a plurality of types of filters. For example, the types include "ROADTRIP" for emphasizing the blue color of a blue sky or the white color of a cloud, "TIME" for expression in black and white like an old photo, and "MEMORY" for expression in a manner of fading color as if time has elapsed. Setting may be performed such that a specific filter is not used under a specific environment such as "ROADTRIP" which is not available during a fight, in accordance with a photographing condition. In addition, the original image may be used without applying a filter, or setting may be performed such that a user edits an image and applies the user's preferred filter to the image.

In addition, a usable filter may be changed in accordance with a progression state of a content. For example, in a case where a character having a hobby of photographing is accompanied, the number of types of usable filters is small at the beginning of the start of the content due to low photographing skill, but the photographing skill is improved and the number of types of usable filters is increased with the progress of the content.

The attribute information extracted in step S51 and the image data having been subjected to the filtering in step S52 are stored in association with each other (step S53). The image data is stored in the RAM 12 or the storage unit 13 (step S54), and the process is terminated.

The first photographing process using the above-described first virtual camera and the second photographing process using the second virtual camera are repeatedly executed within a predetermined period. When the predetermined period elapses, it is determined whether or not a second image has been generated (step S30). It is possible to appropriately change a determination condition regarding whether or not a predetermined number of images obtained by photographing is equal to or less than a required minimum number of images in order to extract a photo to be described later.

In a case where the number of second images generated within the predetermined period is equal to or less than the predetermined number of second images (YES in step S30), the above-described second photographing process is executed (step S31), and the second image generation process is executed (step S32). A random trigger is suitable as a photographing condition to be selected in this case, but other photographing conditions may be selected. In a case where the number of second images generated within the predetermined period is not equal to or less than the predetermined number of second images (NO in step S30), it is determined that the number of second images is sufficient, and step S31 and step S32 are not executed.

Next, the second image to be displayed on the display screen 23 is selected (step S33). The selection of the image is performed on the basis of the attribute which is set in step S51. For example, a deletion score indicating whether to perform deletion is calculated with respect to the generated second image, and the second images are deleted in order from an image having a large deletion score calculated, thereby selecting the predetermined number of second images.

An example of the setting of a deletion score will be described. The deletion score can be calculated using a redundancy score indicating the degree of redundancy of an attribute of an image and an individuality score indicating the individuality of the image.

Here, the redundancy score refers to a value indicating a degree at which the same attribute is also set in other images. When there is a large number of images obtained by photographing the same enemy character or object, the redundancy score is a score which is used to exclude the presence of the images. However, the redundancy score may not be counted for an image related to a main character given the user's operation instruction. On the other hand, the individuality score refers to a value indicating the importance of an image, and is a score which is added in a case where an attribute which is set in the image is set in only the single image. That is, for example, when there is only one photo obtained by photographing a main character, the individuality score of the photo is increased, and the deletion score is decreased, thereby making it difficult to delete the photo.

The deletion score can be calculated by the following mathematical formula.

Deletion Score=Σ(Redundancy Score of Each Attribute)−Σ(Individuality Score of Each Attribute)

Redundancy Score=Redundancy Coefficient×The Number of Images Having the Same Attribute Set Therein A selected display image is displayed on the display screen 23 (step S34). A content is progressed in accordance with the substance of the displayed image (step S35), and the process is terminated.

A process of progressing the content in accordance with the substance of the displayed image in step S35 will be described. For example, in a case where an image captured by a character accompanied is developed in a photo, an event of a conversation with a friend character may occur while viewing the photo. In this case, it is possible to obtain evaluation such as "the photo is well taken" or "the photo is out of focus" in accordance with a result of the photo. The evaluation of the photo may be performed on the basis of the attribute information on the photo which is extracted in step S51.

In addition, the evaluation may be performed in accordance with the user's operation instruction. In addition, familiarity between characters may be increased through the evaluation. For example, a character having a high degree of familiarity can also be easily taken in the photo.

When the evaluation of the photo is received, history information related to the evaluation may be stored. In this case, it is possible to cause the computer apparatus to automatically examine an improvement measure regarding how photographing has to be performed in order to capture an image regarded as being "better", on the basis of evaluation information received in the past. In this manner, the user learns a tendency such as the user's preferred composition or hue with respect to the photo by a character to be targeted of photographing by only performing evaluation on the photo without ever being conscious of an improvement in photographing skill for a character, and thus an image closer to the user's preference is provided. As a result, the user can feel a three-dimensional virtual space more familiar while confirming the user's preferred photo and to obtain a feel of immersion as if the user travels.

The second image displayed in step S34 may be associated with another SNS system or the like. It is possible to transmit the second image by connection to another computer apparatus through a communication network 2 from a communication interface 17 of the computer apparatus 1 and to share the substance of the content with another user through the communication network.

Although RPG has been described in the seventh embodiment, the invention is not limited to these examples, and can also be used in a scene where a state having a plurality of viewpoints is reproduced. For example, in a drive simulator, it is possible to assume a state where the first virtual camera has a viewpoint of a driver who drives a car and the second virtual camera has a viewpoint of a passerby who gazes at the car. In this case, the invention can also be applied to a program for causing the passerby to easily confirm the state of a road which is hardly confirmed from the driver's seat and for preventing an accident from occurring due to a difference in viewpoint.

As an aspect of the seventh embodiment, a second image different from a first image is generated, and the first image and the second image are generated by photographing a three-dimensional virtual space in parallel, so that it is possible to display the substance of a game in an image different from substance displayed during the progression of the game without replaying the game by the user. As an aspect of the seventh embodiment, the user can review the substance of the progression of the game by the second image after playing the game, and thus it is possible to give, for example, a sense of traveling in the game and reviewing the substance of the travel after traveling to the user.

As an aspect of the seventh embodiment, a configuration is adopted in which the second virtual camera performs photographing in a case where an attribute of a content in progress is a predetermined attribute, so that it is possible to make a photographing timing vary in accordance with the attribute of the content, and thus it is possible to preferentially photograph, for example, an impressive scene for the user.

As an aspect of the seventh embodiment, a configuration is adopted in which an evaluation value is calculated for each object which is present in a three-dimensional virtual space and photographing is performed in a case where the calculated evaluation value exceeds a predetermined reference value, so that it is possible to generate an image in a case where the calculated evaluation value exceeds the predetermined reference value (for example, in a case where the state of the three-dimensional virtual space is a state that the user feels impressive).

As an aspect of the seventh embodiment, a configuration is adopted in which an evaluation value is calculated using information on an object to be targeted of photographing in a three-dimensional virtual space and photographing is performed in a case where the calculated evaluation value exceeds a predetermined reference value, so that it is possible to generate an image in a case where the calculated evaluation value exceeds the predetermined reference value (for example, in a case where the state of the object is a state that the user feels impressive).

As an aspect of the seventh embodiment, a configuration is adopted in which the second virtual camera performs photographing in a case where a processing load of the computer apparatus falls below a predetermined reference value, so that it is possible to prevent the processing load of the computer apparatus from being temporarily excessively increased.

As an aspect of the seventh embodiment, a configuration is adopted in which photographing is performed in a case where the number of times of photographing within a predetermined period is equal to or less than a predetermined number of times when the predetermined period has elapsed, so that it is possible to prevent photographing from being concentrated only during a specific period of the progression of a content. As a result, it is also possible to generate a second image with respect to the substance of the content which is hardly remembered by the user.

As an aspect of the seventh embodiment, photographing is performed in a case where a predetermined operation instruction is input by the user, so that it is possible to generate an image in a scene in which the user likes the substance of a content or has a special feeling.

As an aspect of the seventh embodiment, an image is generated by performing predetermined processing on a captured image, and thus it is possible to effectively emphasize the substance of a content.

As an aspect of the seventh embodiment, the mode of an object to be targeted of photographing by the second virtual camera is controlled so as to change depending on the user's operation instruction, a history of the content, or a progression state of the content, and thus it is possible to display a state inside a three-dimensional virtual space which has not been displayed in a first image having been viewed by the user, as a second image during the progression of the content.

As an aspect of the seventh embodiment, a photographing theme for determining the position and the like of a virtual camera is selected in accordance with a photographing condition, and thus the user can perform photographing suitable for the substance of a content without having particular consciousness and can remember the substance of the content without a burden.

As an aspect of the seventh embodiment, a usable filter is changed in accordance with a progression state of a content, and thus the user can be given an impression that photographing skill is improved in accordance with the progression state of the content.

As an aspect of the seventh embodiment, only an image satisfying a predetermined condition is selected from a plurality of captured images, so that it is possible to display an image accurately showing the substance of a content by omitting an image having the same substance, and thus the user can more simply ascertain the substance of the content.

As an aspect of the seventh embodiment, a content is progressed in accordance with the substance of a displayed second image, and thus, for example, it is possible to cause not only the user but also a character appearing in the content to ascertain the second image to review the substance of the content and it is possible to cause the user to share the character's feeling. In this manner, the user gets more interested in the content and can improve the taste of the content.

As an aspect of the seventh embodiment, a new second image is captured on the basis of the user's evaluation information on an image displayed as a second image, and thus it is possible to generate an image based on the user's preferred tendency, and the user can feel a three-dimensional virtual space more familiar and obtain a feel of immersion as if the user travels.

According to the seventh embodiment, the "computer apparatus", the "state of three-dimensional virtual space", the "content", the "virtual camera", the "image", and the "photographing in parallel" are respectively the same as the contents described in the first embodiment. In addition, the "position", "gaze point", and "inclination" are respectively the same as the contents described in the second embodiment.

According to the seventh embodiment, the "skeletal information" is the same as the contents described in the fourth embodiment, and the "information on environment" is the same as the contents described in the fifth embodiment.

According to the seventh embodiment, the "performing predetermined processing on image" means, for example, changing the brightness or chroma of a generated image by using a filter or the like. The "history of content" means, for example, history information stored in progressing a content, and is a concept including the user's operation instruction, an action of an object, an obtained item, a point, a parameter of an object, and the like. The "progression state of content" means, for example, information regarding a parameter indicating a progression state at the present point in time which is occupied in the entire content or a state indicating the state of the content. The "another computer apparatus" means, for example, a computer apparatus, a server apparatus, a portable terminal apparatus, or the like which can be connected to the computer apparatus through a communication line. Here, the communication line may be a wired or wireless line, and also includes infrared communication.

Eighth Embodiment

Figure 12:
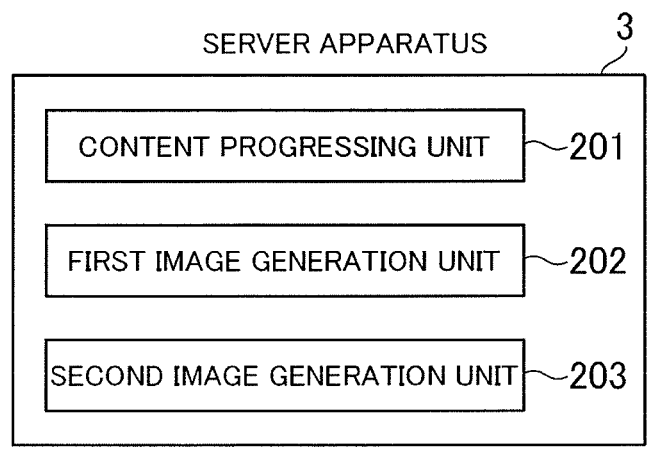
FIG. 12 is a block diagram illustrating a configuration of a server apparatus, which corresponds to at least one embodiment according to the present invention.

An eighth embodiment of the invention will be described. FIG. 12 is a block diagram illustrating a configuration of a server apparatus, which corresponds to at least one embodiment according to the present invention. A server apparatus 3 includes at least a content progressing unit 201, a first image generation unit 202, and a second image generation unit 203.

The content progressing unit 201 has a function of progressing a content so that the state of a three-dimensional virtual space changes with the elapse of time. The first image generation unit 202 has a function of photographing the three-dimensional virtual space by a virtual camera to generate a first image. The second image generation unit 203 has a function of photographing the three-dimensional virtual space by a virtual camera to generate a second image different from the first image.

Figure 13:
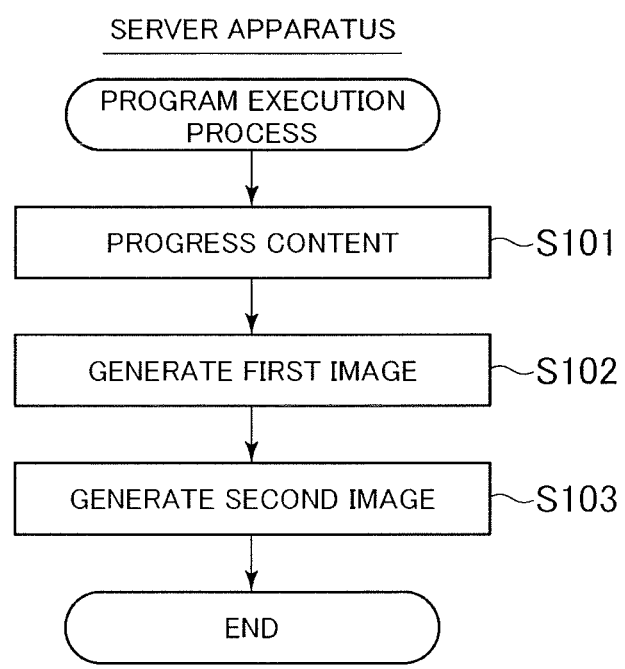
FIG. 13 is a flowchart of the program execution process, which corresponds to at least one embodiment according to the present invention.

A program execution process in the eighth embodiment of the invention will be described. FIG. 13 is a flowchart of the program execution process, which corresponds to at least one embodiment according to the present invention.

The server apparatus 3 progresses a content so that the state of the three-dimensional virtual space changes with the elapse of time (step S101). Next, the three-dimensional virtual space is photographed by the virtual camera to generate the first image (step S102). The three-dimensional virtual space is photographed by the virtual camera to generate the second image different from the first image (step S103), and the process is terminated.

In the eighth embodiment, a computer apparatus synchronously displays the state of the three-dimensional virtual space and the first image on a display screen, and displays the second image on the display screen asynchronously with the first image.

In the eighth embodiment, the first image and the second image are obtained by photographing the three-dimensional virtual space in parallel.

As an aspect of the eighth embodiment, the second image different from the first image is generated, and the first image and the second image are generated by photographing the three-dimensional virtual space in parallel, so that it is possible to display the substance of a content in an image different from substance displayed during the progress of the content without replaying the content by a user.

According to the eighth embodiment, the "computer apparatus", the "state of three-dimensional virtual space", the "content", the "virtual camera", the "image", and the "photographing in parallel" are respectively the same as the contents described in the first embodiment.

According to the eighth embodiment, the "server apparatus" means, for example, an apparatus that executes processing in response to a request received from the computer apparatus.

Ninth Embodiment

Figure 14:
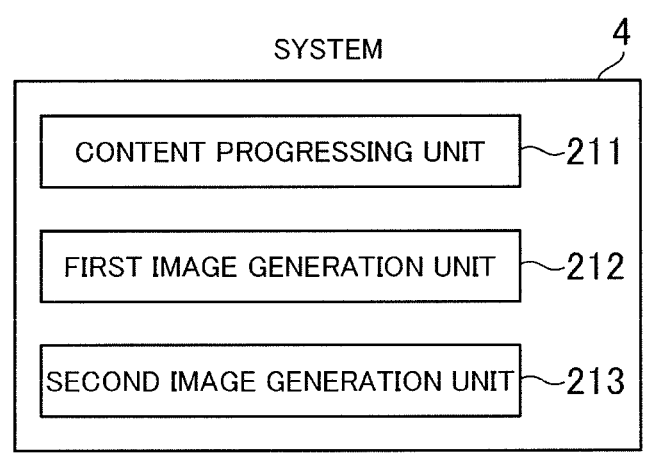
FIG. 14 is a block diagram illustrating a configuration of a system, which corresponds to at least one embodiment according to the present invention.

A ninth embodiment of the invention will be described. FIG. 14 is a block diagram illustrating a configuration of a system, which corresponds to at least one embodiment according to the present invention. A system 4 includes at least a content progressing unit 211, a first image generation unit 212, and a second image generation unit 213.

The content progressing unit 211 has a function of progressing a content so that the state of a three-dimensional virtual space changes with the elapse of time. The first image generation unit 212 has a function of photographing the three-dimensional virtual space by a virtual camera to generate a first image. The second image generation unit 213 has a function of photographing the three-dimensional virtual space by a virtual camera to generate a second image different from the first image.

Figure 15:
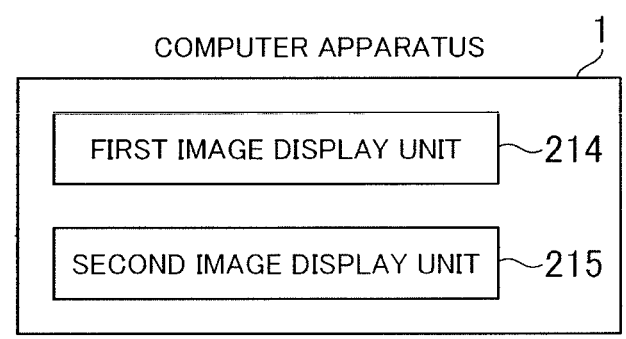
FIG. 15 is a block diagram illustrating a configuration of a computer apparatus, which corresponds to at least one embodiment according to the present invention.

FIG. 15 is a block diagram illustrating a configuration of a computer apparatus, which corresponds to at least one embodiment according to the present invention. The computer apparatus 1 includes at least a first image display unit 214 and a second image display unit 215.

The first image display unit 214 has a function of synchronously displaying the state of the three-dimensional virtual space and the first image on a display screen. The second image display unit 215 has a function of displaying the second image on the display screen asynchronously with the first image.

Figure 16:
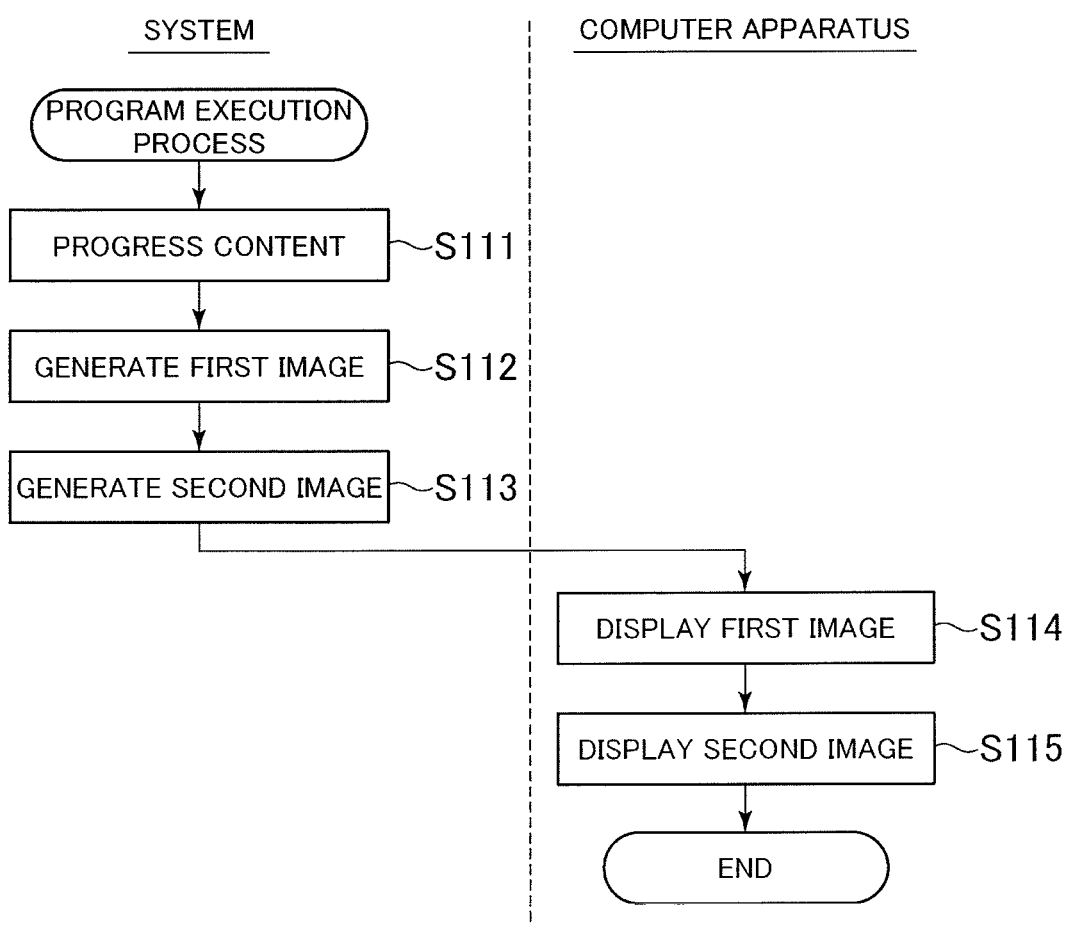
FIG. 16 is a flowchart of the program execution process, which corresponds to at least one embodiment according to the present invention.

A program execution process in the ninth embodiment of the invention will be described. FIG. 16 is a flowchart of the program execution process, which corresponds to at least one embodiment according to the present invention.

The system 4 progresses a content so that the state of the three-dimensional virtual space changes with the elapse of time (step S111). Next, the three-dimensional virtual space is photographed by the virtual camera to generate the first image (step S112). The three-dimensional virtual space is photographed by the virtual camera to generate the second image different from the first image (step S113).

Subsequently, the computer apparatus 1 synchronously displays the state of the three-dimensional virtual space and the first image on the display screen (step S114). The second image is displayed on the display screen asynchronously with the first image (step S115), and the process is terminated.

In the ninth embodiment, the first image and the second image are obtained by photographing the three-dimensional virtual space in parallel.

As an aspect of the ninth embodiment, the second image different from the first image is generated, and the first image and the second image are generated by photographing the three-dimensional virtual space in parallel, so that it is possible to display the substance of a content in an image different from substance displayed during the progress of the content without replaying the content by a user.

According to the ninth embodiment, the "computer apparatus", the "state of three-dimensional virtual space", the "content", the "virtual camera", the "image", and the "photographing in parallel" are respectively the same as the contents described in the first embodiment.

According to the ninth embodiment, the "system" means, for example, a combination of hardware, software, a net and the like.

Tenth Embodiment

A tenth embodiment of the invention will be described. Regarding a configuration of a computer apparatus in the tenth embodiment, it is possible to adopt the same configuration as that illustrated in the block diagram of FIG. 15.

Figure 17:
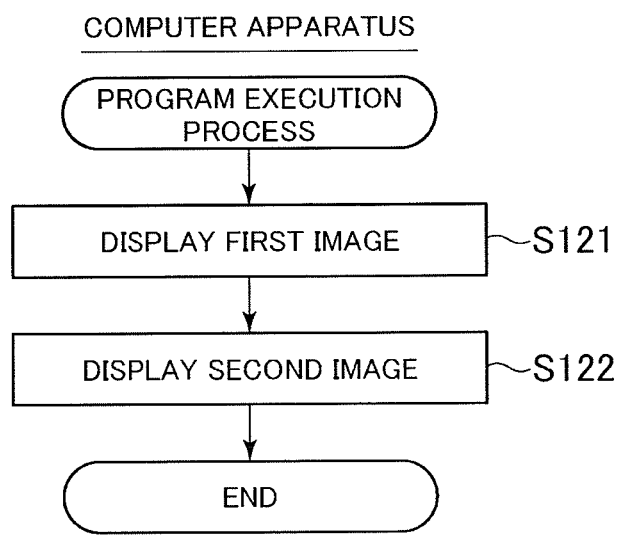
FIG. 17 is a flowchart of the program execution process, which corresponds to at least one embodiment according to the present invention.

A program execution process in the tenth embodiment of the invention will be described. FIG. 17 is a flowchart of the program execution process, which corresponds to at least one embodiment according to the present invention.

A computer apparatus 1 synchronously displays the state of a three-dimensional virtual space and a first image on a display screen (step S121). Next, a second image is displayed on the display screen asynchronously with the first image (step S122), and the process is terminated.

In the tenth embodiment, a server apparatus progresses a content so that the state of a three-dimensional virtual space changes with the elapse of time and photographs the three-dimensional virtual space by a virtual camera to generate the first image, and photographs the three-dimensional virtual space by a virtual camera to generate the second image different from the first image.

In the tenth embodiment, the first image and the second image are obtained by photographing the three-dimensional virtual space in parallel.

As an aspect of the tenth embodiment, the second image different from the first image is generated, and the first image and the second image are generated by photographing the three-dimensional virtual space in parallel, so that it is possible to display the substance of a content in an image different from substance displayed during the progress of the content without replaying the content by a user.

According to the tenth embodiment, the "computer apparatus", the "state of three-dimensional virtual space", the "content", the "virtual camera", the "image", and the "photographing in parallel" are respectively the same as the contents described in the first embodiment. In addition, the "server apparatus" is the same as the contents described in the eighth embodiment.

Eleventh Embodiment

Figure 18:
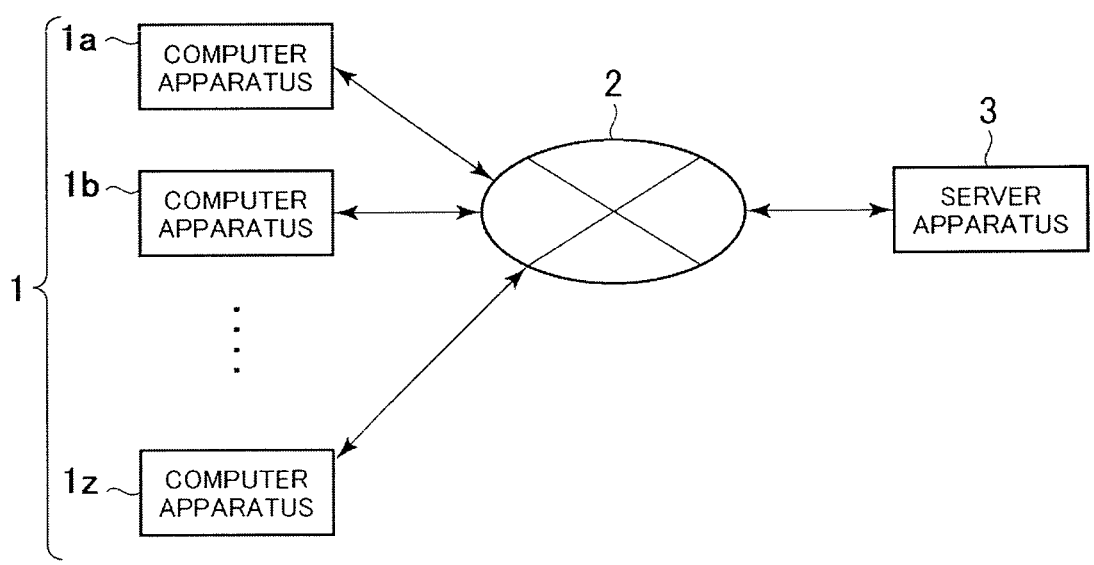
FIG. 18 is a block diagram illustrating a configuration of a system, which corresponds to at least one embodiment according to the present invention.

An outline of an eleventh embodiment of the invention will be described. FIG. 18 is a block diagram illustrating a configuration of a system, which corresponds to at least one embodiment according to the present invention. As illustrated in the drawing, the system includes a plurality of computer apparatuses 1 (computer apparatuses 1a, 1b, . . . , and 1z) that are operated by a plurality of users (users A, B, . . . , and Z), a server apparatus 3, and a communication network 2. The computer apparatuses 1 are connected to the server apparatus 3 through the communication network 2. Meanwhile, the computer apparatuses 1 may be connected to the server apparatus 3 at all times or as necessary.

Regarding a configuration of the computer apparatus in the eleventh embodiment, it is possible to adopt the same configuration as that illustrated in the block diagram of the computer apparatus of FIG. 5.

Figure 19:
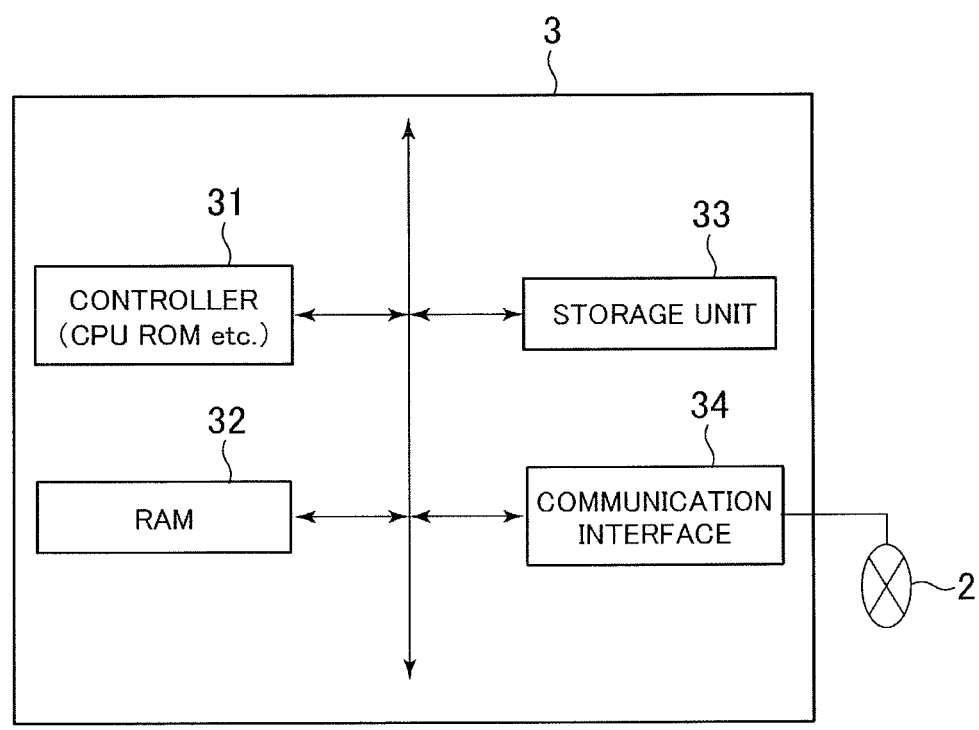
FIG. 19 is a block diagram illustrating a configuration of a server apparatus, which corresponds to at least one embodiment according to the invention.

FIG. 19 is a block diagram illustrating a configuration of a server apparatus, which corresponds to at least one embodiment according to the invention. A server apparatus 3 includes a controller 31, a RAM 32, a storage unit 33, and a communication interface 34, which are connected to each other through respective internal buses thereof.

The controller 31 is constituted by a CPU or a ROM, executes a program stored in the storage unit 33, and controls the server apparatus 3. In addition, the controller 31 includes an internal timer that clocks a time. The RAM 32 is a work area of the controller 31. The storage unit 33 is a storage region for storing programs and data. The controller 31 reads out the programs and the data from the RAM 32, and performs a program execution process on the basis of request information received from the computer apparatus 1.

An example of the eleventh embodiment is a program of a Role Playing Game (hereinafter, referred to as RPG) in which a character operated by a user can freely move around in a three-dimensional virtual space and progresses a story while performing a virtual fight with an enemy character. In the game, the three-dimensional virtual space is photographed using a plurality of virtual cameras, and an image captured by each of the virtual cameras is displayed on a display screen. Apart from the virtual camera that photographs the state of the three-dimensional virtual space, a character who is a fellow having a camera and is automatically controlled may be set to photograph the inside of the three-dimensional virtual space.

In the program according to this embodiment, a three-dimensional virtual space is formed as a space in which a character is movable, and a user operates an input unit 20 to give an instruction, thereby progressing a game. The setting of a coordinate system in the three-dimensional virtual space overlaps with a description in the seventh embodiment, and thus a description thereof will be omitted. In addition, regarding a perspective transformation method, it is possible to adopt the substance illustrated in FIG. 6.

Figure 20:
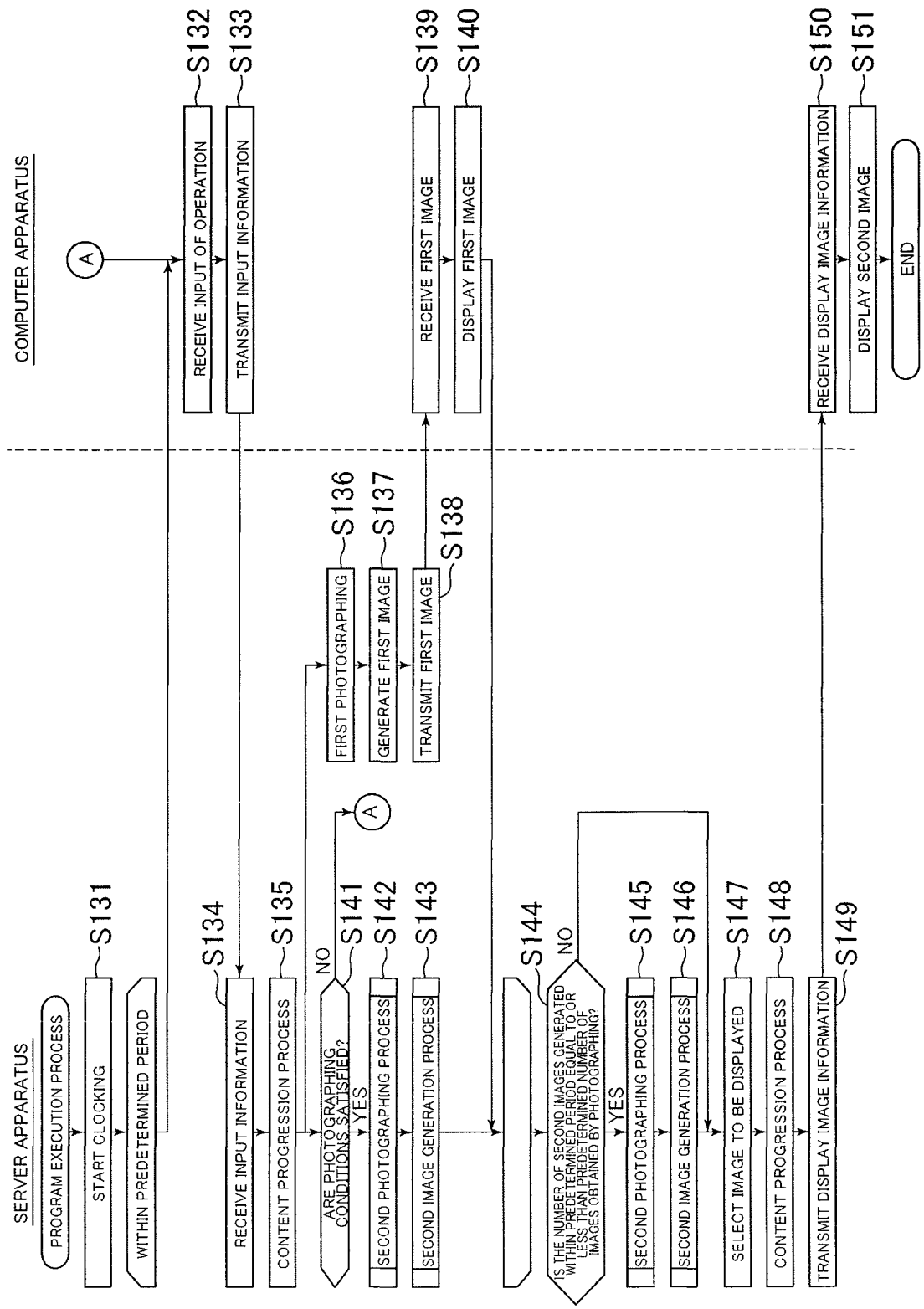
FIG. 20 is a flowchart of the program execution process, which corresponds to at least one embodiment according to the present invention.

Subsequently, a program execution process in the eleventh embodiment of the invention will be described. FIG. 20 is a flowchart of the program execution process, which corresponds to at least one embodiment according to the present invention.

When a process of executing the program is started, clocking is started by an internal timer included in the controller 31 of the server apparatus 3 (step S131). In this embodiment, the photographing of a three-dimensional virtual space is executed by division for each predetermined period.

When the computer apparatus 1 receives a user's operation with respect to the input unit 20 (step S132), the computer apparatus transmits input information to the server apparatus 3 (step S133).

When the server apparatus 3 receives the input information (step S134), the server apparatus progresses a content in accordance with the user's operation instruction (step S135).

Next, in the eleventh embodiment of the invention, the photographing processes using a first virtual camera and a second virtual camera are processed in parallel. The parallel processing is executed by a single CPU or a plurality of CPUs included in the controller 31.

First, the photographing process in the three-dimensional virtual space using the first virtual camera will be described. The first virtual camera photographs the state of the three-dimensional virtual space (step S136). When the state of the three-dimensional virtual space is photographed, a first image to be displayed on a display screen 23 is generated (step S137). It is preferable that the first image is generated in accordance with a frame time. The generated first image is transmitted to the computer apparatus 1 (step S138).

When the computer apparatus 1 receives the first image from the server apparatus 3 (step S139), the first image is displayed on the display screen 23 (step S140).

The first image generated in step S137 is an image for synchronously representing the state of the three-dimensional virtual space. The user can know the state of the three-dimensional virtual space by confirming the image displayed in step S140.

Next, the photographing process in the three-dimensional virtual space using the second virtual camera will be described. The second virtual camera determines whether or not predetermined photographing conditions are satisfied, unlike the photographing using the first virtual camera (step S141), and photographs the three-dimensional virtual space in a case where the photographing conditions are satisfied (YES in step S141). In a case where the photographing conditions are not satisfied (NO in step S141), the second virtual camera stands by until the user's new operation input is received without photographing the three-dimensional virtual space.

The photographing conditions of the second virtual camera include an evaluation value trigger, an event trigger, a random trigger, and a manual trigger. Regarding each of the photographing conditions, it is possible to adopt the substance described in the seventh embodiment, and thus a description thereof will be omitted.

Subsequently, in a case where the photographing conditions are satisfied in step S141 of FIG. 20 (YES in step S141), a second photographing process is executed (step S142). Regarding the second photographing process, it is possible to adopt the same process as the substance illustrated in FIG. 9.

When the second photographing process is terminated, a second image generation process is executed (step S143). Regarding the second image generation process, it is possible to adopt the same process as the substance illustrated in FIG. 11.

The first photographing process using the first virtual camera and the second photographing process using the second virtual camera are repeatedly executed within a predetermined period. When the predetermined period elapses, it is determined whether or not a second image has been generated (step S144). It is possible to appropriately change a determination condition regarding whether or not a predetermined number of images obtained by photographing is equal to or less than a required minimum number of images in order to extract a photo to be described later.

In a case where the number of second images generated within the predetermined period is equal to or less than the predetermined number of second images (YES in step S144), the above-described second photographing process is executed (step S145), and the second image generation process is executed (step S146). The random trigger is suitable as a photographing condition to be selected in this case, but other photographing conditions may be selected. In a case where the number of second images generated within the predetermined period is not equal to or less than the predetermined number of captured images (NO in step S144), it is determined that the number of second images is sufficient, and step S145 and step S146 are not executed.

Next, the second image to be displayed on the display screen 23 is selected (step S147). The selection of the image is performed on the basis of an attribute which is set in an image in the second image generation process. Regarding a method of selecting a display image, it is possible to adopt the selection method using the deletion score described in the seventh embodiment.

Next, a content is progressed in accordance with the substance of the selected display image (step S148). The display image information selected in step S147 and the substance of the content progressed in step S148 are transmitted to the computer apparatus 1 (step S149).

The computer apparatus 1 receives the transmitted display image information and substance of the content (step S150) and displays the received information and substance on the display screen 23 (step S151), and the process is terminated.

Regarding the process of progressing the content in accordance with the substance of the selected image in step S148, it is possible to adopt the same process as the process executed in step S35 of FIG. 7.

The second image displayed in step S151 may be associated with another SNS system or the like. It is possible to transmit the second image by connection to another computer apparatus through a communication network 2 from a communication interface 17 of the computer apparatus 1 and to share the substance of the content with another user through the communication network. Alternatively, information for identifying an image to be transmitted to another computer apparatus and a request to be transmitted to another computer apparatus may be transmitted to the server apparatus 3, and the server apparatus 3 may deliver the received information and request to another computer apparatus.

As an aspect of the eleventh embodiment, a second image different from a first image is generated, and the first image and the second image are generated by photographing a three-dimensional virtual space in parallel, so that it is possible to display the substance of a game in an image different from substance displayed during the progression of the game without replaying the game by the user. As an aspect of the eleventh embodiment, the user can review the substance of the progression of the game by the second image after playing the game, and thus it is possible to give, for example, a sense of traveling in the game and reviewing the substance of the travel after traveling to the user.

As an aspect of the eleventh embodiment, a configuration is adopted in which the second virtual camera performs photographing in a case where an attribute of a content in progress is a predetermined attribute, so that it is possible to make a photographing timing vary in accordance with the attribute of the content, and thus it is possible to preferentially photograph, for example, an impressive scene for the user.

As an aspect of the eleventh embodiment, a configuration is adopted in which an evaluation value is calculated for each object which is present in a three-dimensional virtual space and photographing is performed in a case where the calculated evaluation value exceeds a predetermined reference value, so that it is possible to generate an image in a case where the calculated evaluation value exceeds the predetermined reference value (for example, in a case where the state of the three-dimensional virtual space is a state that the user feels impressive).

As an aspect of the eleventh embodiment, a configuration is adopted in which an evaluation value is calculated using information on an object to be targeted of photographing in a three-dimensional virtual space and photographing is performed in a case where the calculated evaluation value exceeds a predetermined reference value, so that it is possible to generate an image in a case where the calculated evaluation value exceeds the predetermined reference value (for example, in a case where the state of the object is a state that the user feels impressive).

As an aspect of the eleventh embodiment, a configuration is adopted in which the second virtual camera performs photographing in a case where a processing load of the computer apparatus falls below a predetermined reference value, so that it is possible to prevent the processing load of the computer apparatus from being temporarily excessively increased.

As an aspect of the eleventh embodiment, a configuration is adopted in which photographing is performed in a case where the number of times of photographing within a predetermined period is equal to or less than a predetermined number of times when the predetermined period has elapsed, so that it is possible to prevent photographing from being concentrated only during a specific period of the progression of a content. As a result, it is also possible to generate a second image with respect to the substance of the content which is hardly remembered by the user.

As an aspect of the eleventh embodiment, photographing is performed in a case where a predetermined operation instruction is input by the user, so that it is possible to generate an image in a scene in which the user likes the substance of a content or has a special feeling.

As an aspect of the eleventh embodiment, an image is generated by performing predetermined processing on a captured image, and thus it is possible to effectively emphasize the substance of a content.

As an aspect of the eleventh embodiment, the mode of an object to be targeted of photographing by the second virtual camera is controlled so as to change depending on the user's operation instruction, a history of the content, or a progression state of the content, and thus it is possible to display a state inside a three-dimensional virtual space which has not been displayed in a first image having been viewed by the user, as a second image during the progression of the content.

As an aspect of the eleventh embodiment, a photographing theme for determining the position and the like of a virtual camera is selected in accordance with a photographing condition, and thus the user can perform photographing suitable for the substance of a content without having particular consciousness and can remember the substance of the content without a burden.

As an aspect of the eleventh embodiment, a usable filter is changed in accordance with a progression state of a content, and thus the user can be given an impression that photographing skill is improved in accordance with the progression state of the content.

As an aspect of the eleventh embodiment, only an image satisfying a predetermined condition is selected from a plurality of captured images, so that it is possible to display an image accurately showing the substance of a content by omitting an image having the same substance, and thus the user can more simply ascertain the substance of the content.

As an aspect of the eleventh embodiment, a content is progressed in accordance with the substance of a displayed second image, and thus, for example, it is possible to cause not only the user but also a character appearing in the content to ascertain the second image to review the substance of the content and it is possible to cause the user to share the character's feeling. In this manner, the user gets more interested in the content and can improve the taste of the content.

As an aspect of the eleventh embodiment, a new second image is captured on the basis of the user's evaluation information on an image displayed as a second image, and thus it is possible to generate an image based on the user's preferred tendency, and the user can feel a three-dimensional virtual space more familiar and obtain a feel of immersion as if the user travels.

According to the eleventh embodiment, the "computer apparatus", the "state of three-dimensional virtual space", the "content", the "virtual camera", the "image", and the "photographing in parallel" are respectively the same as the contents described in the first embodiment. In addition, the "position", "gaze point", and "inclination" are respectively the same as the contents described in the second embodiment.

According to the eleventh embodiment, the "skeletal information" is the same as the contents described in the fourth embodiment, the "information on environment" is the same as the contents described in the fifth embodiment.

According to the eleventh embodiment, the "performing predetermined processing on image", the "history of content", the "progression state of content", and the "another computer apparatus" are respectively the same as the contents described in the seventh embodiment.

Appendix

The above-described embodiments have been described so that those skilled in the art can implement the following invention.

[1] An image display program executed on a computer apparatus including a display screen, the image display program causing the computer apparatus to function as:

a content processor that progresses a content so that a state of a three-dimensional virtual space changes with elapse of time;

a first image generator that photographs the three-dimensional virtual space by a virtual camera to generate a first image;

a second image generator that photographs the three-dimensional virtual space by a virtual camera to generate a second image different from the first image;

a first image displayer that synchronously displays the state of the three-dimensional virtual space and the first image on the display screen; and a second image displayer that displays the second image on the display screen asynchronously with the first image, wherein the first image and the second image are obtained by photographing the three-dimensional virtual space in parallel.

[2] The image display program according to [1],
wherein the first image generator includes a first photographer that photographs the three-dimensional virtual space by a first virtual camera, and
wherein the second image generator includes a second photographer that photographs the three-dimensional virtual space by a second virtual camera having a different position, gaze point, or inclination from that of the first virtual camera.

[3] The image display program according to [2],
wherein an object in the three-dimensional virtual space has an attribute regarding by which virtual camera out of the first virtual camera and the second virtual camera the object is to be targeted of photographing or an attribute regarding by which virtual camera the object is not to be targeted of photographing, and
wherein the first photographer and/or the second photographer photographs the three-dimensional virtual space in accordance with the attribute of the object.

[4] The image display program according to [2] or [3],
wherein the second photographer determines the position, gaze point, or inclination of the second virtual camera on the basis of skeletal information on the object to be targeted of photographing in the three-dimensional virtual space to photograph an inside of the three-dimensional virtual space.

[5] The image display program according to any one of [2] to [4],
wherein the second photographer determines the position, gaze point, or inclination of the second virtual camera on the basis of information on an environment in which the object to be targeted of photographing is present in the three-dimensional virtual space to photograph the inside of the three-dimensional virtual space.

[6] The image display program according to any one of [2] to [5],
wherein the second photographer photographs the inside of the three-dimensional virtual space by the second virtual camera in a case where a predetermined photographing condition is satisfied during progression of the content.

[7] The image display program according to [6],
wherein the predetermined photographing condition is that an attribute of the content in progress is a predetermined attribute.

[8] The image display program according to [6] or [7], causing the computer apparatus to further function as:
an evaluation value calculator that calculates an evaluation value with respect to the progression of the content,
wherein the predetermined photographing condition is that the calculated evaluation value exceeds a predetermined reference value.

[9] The image display program according to [8],
wherein the evaluation value calculator calculates an evaluation value by using the information on the object to be targeted of photographing in the three-dimensional virtual space.

[10] The image display program according to any one of [6] to [9], causing the computer apparatus to further function as:
a load measurer that measures a processing load which is a load of a controller and/or a storage unit of the computer apparatus,
wherein the predetermined photographing condition is that the processing load falls below a predetermined reference value.

[11] The image display program according to any one of [6] to [10],
wherein the predetermined photographing condition is that a predetermined operation instruction is input by a user.

[12] The image display program according to any one of [6] to [11], causing the computer apparatus to further function as:
a timer that clocks a time; and
a frequency storage that stores the number of times of photographing performed by the photographer,
wherein the predetermined photographing condition is that the number of times of photographing within a predetermined period is equal to or less than a predetermined number of times when the predetermined period has elapsed.

[13] The image display program according to any one of [1] to [12],
wherein the second image generator generates the second image by performing predetermined processing on an image obtained by photographing.

[14] The image display program according to any one of [1] to [13],
wherein the content processor includes an object controller that performs control so that a mode of the object to be targeted of photographing by the second virtual camera changes in accordance with the user's operation instruction, a history of the content, or a progression state of the content.

[15] The image display program according to any one of [1] to [14], causing the computer apparatus capable of communicating with another computer apparatus, the image display program causing the computer apparatus to further function as:
an image transmitter that transmits the second image generated by the second image generator to another computer apparatus.

[16] A computer apparatus including a display screen, the computer apparatus including:
content processor that progresses a content so that a state of a three-dimensional virtual space changes with elapse of time;
a first image generator that photographs the three-dimensional virtual space by a virtual camera to generate a first image;
a second image generator that photographs the three-dimensional virtual space by a virtual camera to generate a second image different from the first image;
a first image displayer that synchronously displays the state of the three-dimensional virtual space and the first image on the display screen; and
a second image displayer that displays the second image on the display screen asynchronously with the first image,
wherein the first image and the second image are obtained by photographing the three-dimensional virtual space in parallel.

[17] An image display method executed on a computer apparatus including a display screen, the image display method including:
progressing a content so that a state of a three-dimensional virtual space changes with elapse of time;
generating a first image by photographing the three-dimensional virtual space by a virtual camera to generate a first image;
generating a second image by photographing the three-dimensional virtual space by a virtual camera to generate a second image different from the first image;
displaying a first image that displays synchronously the state of the three-dimensional virtual space and the first image on the display screen; and displaying a second image on the display screen asynchronously with the first image, wherein the first image and the second image are obtained by photographing the three-dimensional virtual space in parallel.

[18] An image display program executed on a server apparatus capable of communicating with a computer apparatus including a display screen, the image display program causing the server apparatus to function as:

a content processor that progresses a content so that a state of a three-dimensional virtual space changes with elapse of time;

a first image generator that photographs the three-dimensional virtual space by a virtual camera to generate a first image; and a second image generator that photographs the three-dimensional virtual space by a virtual camera to generate a second image different from the first image, wherein the computer apparatus synchronously displays the state of the three-dimensional virtual space and the first image on the display screen, and displays the second image on the display screen asynchronously with the first image, and wherein the first image and the second image are obtained by photographing the three-dimensional virtual space in parallel.

[19] A server apparatus in which the program according to [18] is installed.

[20] An image display system that includes a computer apparatus including a display screen and a server apparatus capable of communicating with the computer apparatus, the image display system including:

a content processor that progresses a content so that a state of three-dimensional virtual space changes with elapse of time;

a first image generator that photographs the three-dimensional virtual space by a virtual camera to generate a first image; and a second image generator that photographs the three-dimensional virtual space by a virtual camera to generate a second image different from the first image, wherein the computer apparatus includes a first image displayer that synchronously displays the state of the three-dimensional virtual space and the first image on the display screen, and a second image displayer that displays the second image on the display screen asynchronously with the first image, and wherein the first image and the second image are obtained by photographing the three-dimensional virtual space in parallel.

[21] An image display program executed on a server apparatus and a computer apparatus that includes a display screen and is capable of being connected to the server apparatus by communication, wherein the server apparatus progresses a content so that a state of a three-dimensional virtual space changes with elapse of time, photographs the three-dimensional virtual space by a virtual camera to generate a first image, and photographs the three-dimensional virtual space by a virtual camera to generate a second image different from the first image, and the image display program causing the computer apparatus to function as:

a first image displayer that synchronously displays the state of the three-dimensional virtual space and the first image on the display screen; and a second image displayer that displays the second image on the display screen asynchronously with the first image, wherein the first image and the second image are obtained by photographing the three-dimensional virtual space in parallel.

[22] A computer apparatus in which the program according to [21] is installed.

[23] An image display method executed on a server apparatus capable of communicating with a computer apparatus including a display screen, the image display method including:

progressing a content so that a state of a three-dimensional virtual space changes with elapse of time;

generating a first image by photographing the three-dimensional virtual space by a virtual camera to generate a first image; and generating a second image by photographing the three-dimensional virtual space by a virtual camera to generate a second image different from the first image, wherein in the computer apparatus, the state of the three-dimensional virtual space and the first image are synchronously displayed on the display screen, and the second image is displayed on the display screen asynchronously with the first image, and wherein the first image and the second image are obtained by photographing the three-dimensional virtual space in parallel.

[24] An image display method executed on a system that includes a computer apparatus including a display screen and a server apparatus capable of communicating with the computer apparatus, the image display method including:

progressing a content so that a state of a three-dimensional virtual space changes with elapse of time;

generating a first image by photographing the three-dimensional virtual space by a virtual camera to generate a first image; and generating a second image by photographing the three-dimensional virtual space by a virtual camera to generate a second image different from the first image, wherein in the computer apparatus, the state of the three-dimensional virtual space and the first image are synchronously displayed on the display screen, and the second image is displayed on the display screen asynchronously with the first image, and wherein the first image and the second image are obtained by photographing the three-dimensional virtual space in parallel.

The invention claimed is:

1. A non-transitory computer-readable recording medium including an image display program which is executable by a computer apparatus, the computer apparatus including a display screen, the image display program, when executed, causing the computer apparatus to perform operations comprising:

progressing a content so that a state of a three-dimensional virtual space changes with an elapse of time;

photographing the three-dimensional virtual space by at least one virtual camera to generate a first image;

photographing the three-dimensional virtual space by the at least one virtual camera to generate a second image different from the first image;

synchronously displaying the state of the three-dimensional virtual space and the first image on the display screen; and displaying the second image on the display screen asynchronously with the first image, wherein the first image and the second image are obtained by photographing the three-dimensional virtual space in parallel.

2. The non-transitory computer-readable recording medium according to claim 1,
wherein the first image is photographed by a first virtual camera, and
wherein the second image is photographed by a second virtual camera having a different position, gaze point, or inclination than the first virtual camera.

3. The non-transitory computer-readable recording medium according to claim 2,
wherein an object in the three-dimensional virtual space has a first attribute that indicates whether the first virtual camera or the second virtual camera is to photograph the object, or a second attribute that indicates whether the first virtual camera or the second virtual camera is not to photograph the object, and
wherein at least one of the photographing that generates the first image or the photographing that generates the second image photographs the three-dimensional virtual space in accordance with the first attribute or the second attribute of the object.

4. The non-transitory computer-readable recording medium according to claim 2,
wherein, in the photographing that generates the second image, a position, a gaze point, or an inclination of the second virtual camera is determined based on skeletal information of an object to be photographed in the three-dimensional virtual space.

5. The non-transitory computer-readable recording medium according to claim 2,
wherein, in the photographing that generates the second image, a position, a gaze point, or an inclination of the second virtual camera is determined based on information on an environment in which an object to be photographed is present in the three-dimensional virtual space.

6. The non-transitory computer-readable recording medium according to claim 2,
wherein the second virtual camera photographs the three-dimensional virtual space in a case where a predetermined photographing condition is satisfied during progression of the content.

7. The non-transitory computer-readable recording medium according to claim 6,
wherein the predetermined photographing condition includes a third attribute of the content being a predetermined attribute.

8. The non-transitory computer-readable recording medium according to claim 6, the operations further comprising:
calculating an evaluation value with respect to the progression of the content,
wherein the predetermined photographing condition includes the evaluation value exceeding a predetermined reference value.

9. The non-transitory computer-readable recording medium according to claim 8,
wherein the evaluation value is calculated by using information on an object to be photographed in the three-dimensional virtual space.

10. The non-transitory computer-readable recording medium according to claim 6, the operations further comprising:
measuring a processing load of at least one of a controller or a memory of the computer apparatus,
wherein the predetermined photographing condition includes the processing load being below a predetermined reference value.

11. The non-transitory computer-readable recording medium according to claim 6,
wherein the predetermined photographing condition includes a predetermined operation instruction being input by a user.

12. The non-transitory computer-readable recording medium according to claim 6, the operations further comprising:
measuring a time; and
storing a number of times of photographing the three-dimensional virtual space,
wherein the predetermined photographing condition includes the number of times, within a predetermined period, being equal to or less than a predetermined number of times when the predetermined period has elapsed.

13. The non-transitory computer-readable recording medium according to claim 1,
wherein the second image is generated by performing predetermined processing on a captured image.

14. The non-transitory computer-readable recording medium according to claim 1,
wherein a mode of an object to be photographed in the second image is changed in accordance with an operation instruction from a user, a history of the content, or a progression state of the content.

15. The non-transitory computer-readable recording medium according to claim 1, the operations further as comprising:
transmitting the second image to a second computer apparatus, the computer apparatus being capable of communicating with the second computer apparatus.

16. A computer apparatus, comprising:
a display screen;
a processor; and
a memory including an image display program that, when executed by the processor, causes the processor to perform operations comprising:
progressing a content so that a state of a three-dimensional virtual space changes with an elapse of time;
photographing the three-dimensional virtual space by at least one virtual camera to generate a first image;
photographing the three-dimensional virtual space by the at least one virtual camera to generate a second image different from the first image;
synchronously displaying the state of the three-dimensional virtual space and the first image on the display screen; and
displaying the second image on the display screen asynchronously with the first image,
wherein the first image and the second image are obtained by photographing the three-dimensional virtual space in parallel.

17. An image display method executed on a computer apparatus, the computer apparatus including a display screen, the image display method comprising:
progressing a content so that a state of a three-dimensional virtual space changes with an elapse of time;
photographing the three-dimensional virtual space by at least one virtual camera to generate a first image;
photographing the three-dimensional virtual space by the at least one virtual camera to generate a second image different from the first image;

synchronously displaying the state of the three-dimensional virtual space and the first image on the display screen; and displaying the second image on the display screen asynchronously with the first image, wherein the first image and the second image are obtained by photographing the three-dimensional virtual space in parallel.

* * * * *

UNITED STATES PATENT AND TRADEMARK OFFICE
CERTIFICATE OF CORRECTION

PATENT NO. : 10,668,379 B2  
APPLICATION NO. : 15/819399  
DATED : June 2, 2020  
INVENTOR(S) : P. Prasertvithyakarn et al.

Page 1 of 1

It is certified that error appears in the above-identified patent and that said Letters Patent is hereby corrected as shown below:

In the Claims

At Column 34, Line 32 (Claim 15, Line 2), please change "further as" to --further--.

Signed and Sealed this  
Third Day of November, 2020

Andrei Iancu  
*Director of the United States Patent and Trademark Office*